(12) United States Patent
Newman

(10) Patent No.: US 10,401,506 B1
(45) Date of Patent: Sep. 3, 2019

(54) SYSTEM FOR DETECTING AND LOCATING RADIOACTIVE SOURCES

(71) Applicant: David Edward Newman, Poway, CA (US)

(72) Inventor: David Edward Newman, Poway, CA (US)

( * ) Notice: Subject to any disclaimer, the term of this patent is extended or adjusted under 35 U.S.C. 154(b) by 20 days.

(21) Appl. No.: 16/191,335

(22) Filed: Nov. 14, 2018

Related U.S. Application Data

(60) Provisional application No. 62/713,245, filed on Aug. 1, 2018, provisional application No. 62/616,177, filed on Jan. 11, 2018, provisional application No. 62/588,377, filed on Nov. 19, 2017.

(51) Int. Cl.
*G01T 1/167* (2006.01)
*G01T 1/20* (2006.01)
*G01T 3/06* (2006.01)

(52) U.S. Cl.
CPC ............. *G01T 1/167* (2013.01); *G01T 1/20* (2013.01); *G01T 3/06* (2013.01)

(58) Field of Classification Search
CPC .. G01T 1/00; G01T 1/16; G01T 1/167; G01T 1/20
USPC ............ 250/358.1, 363.01, 370.05, 370.09, 250/370.11, 393
See application file for complete search history.

(56) References Cited

U.S. PATENT DOCUMENTS

| | | | |
|---|---|---|---|
| 3,047,721 A | 9/1959 | Folsom | |
| 3,581,090 A | 5/1971 | Brown | |
| 5,354,084 A | 9/1994 | Byrd | |
| 5,665,970 A | 9/1997 | Kronenberg | |
| 5,880,469 A | 3/1999 | Miller | |
| 6,433,335 B1 | 8/2002 | Kronenberg | |
| 6,639,210 B2 | 10/2003 | Odom | |
| 7,521,686 B2 | 4/2009 | Stuenkel | |
| 7,745,800 B1 | 6/2010 | McGinnis | |
| 7,952,079 B2 | 5/2011 | Neustadter | |
| 7,994,482 B2 | 8/2011 | Frank | |
| 8,030,617 B2 | 10/2011 | Enghardt | |
| 8,067,742 B2 | 11/2011 | Winso | |
| 8,198,600 B2 | 6/2012 | Neustadter | |
| 8,242,456 B1 * | 8/2012 | Hecht | G01V 5/0075 250/252.1 |
| 8,247,776 B2 | 8/2012 | Peng | |
| 8,319,188 B2 | 11/2012 | Ramsden | |

(Continued)

*Primary Examiner* — David P Porta
*Assistant Examiner* — Blake C Riddick

(57) ABSTRACT

A system of particle detectors can determine the location of a source without rotations or iterations. Embodiments of the system may comprise a middle detector flanked by two shield plates, with two side detector panels exterior to the shields. The middle detector may be positioned toward the front and orthogonal to the side detectors. By comparing a ratio of the detector data to a predetermined angular correlation function, the system can determine both the sign and magnitude of the source angle in real-time. Embodiments of the system can rapidly and automatically localize sources including nuclear and radiological weapons materials, whether in vehicles or cargo containers, and can provide improved sensitivity in walk-through personnel portal applications, enable enhanced detection of hidden weapons by a mobile area scanner, and enable a hand-held survey meter that indicates the radiation level as well as the location of the source of radiation.

20 Claims, 19 Drawing Sheets

(56) References Cited

U.S. PATENT DOCUMENTS

| | | |
|---|---|---|
| 8,866,100 B1 | 10/2014 | Marleau |
| 8,930,165 B2 | 1/2015 | Vilim |
| 9,012,855 B2 | 4/2015 | Speller |
| 9,575,189 B2 | 2/2017 | Groves |
| 2003/0165211 A1 | 7/2003 | Grodzins |
| 2005/0121618 A1 | 6/2005 | Fowler |
| 2008/0048123 A1 | 2/2008 | Larsson |
| 2013/0256538 A1 | 10/2013 | Vogtmeier |
| 2014/0374606 A1 | 12/2014 | Gendotti |
| 2017/0261623 A1 | 9/2017 | Florido |

\* cited by examiner

SYSTEM FOR DETECTING AND LOCATING RADIOACTIVE SOURCES

CROSS REFERENCE TO RELATED APPLICATIONS

This application claims the benefit of U.S. Provisional Patent Application No. 62/588,377 entitled "Directional Gamma Ray Detector" and filed on Nov. 19, 2017, and U.S. Provisional Patent Application No. 62/616,177 entitled "Directional Radiation Detector with Dual Shields" and filed on Jan. 11, 2018, and U.S. Provisional Patent Application No. 62/713,245 entitled "Directional Radiation Monitor with Middle Detector" and filed on Aug. 1, 2018, the entire disclosures of which are incorporated by reference as part of the specification of this application.

FIELD OF THE INVENTION

The present invention relates generally to nuclear weapon detection. More particularly, the present invention is directed in one exemplary aspect to a directional radiation detection system that determines an angle of the radiation source, relative to the system, including the sign and magnitude of the source angle.

BACKGROUND

Smuggled nuclear weapons are an urgent threat to the US and to all nations. Although radioactive weapons and their components emit gamma rays and neutrons, they are difficult to detect when shielded or obfuscated by clutter. An advanced particle detector is needed to reveal and localize threat materials rapidly and reliably. Localization data is also needed to increase the statistical power of each radiation scan in the presence of backgrounds, since even a few gamma rays or neutrons coming from a particular region of the cargo would reveal a hidden source, whereas non-directional detectors require hundreds or thousands of additional detections above background to raise a suspicion that some kind of source might be somewhere nearby. With source localization, the entire inspection process could be speeded up, reducing inspection times and entry waits at shipping ports. Clean loads could be cleared more quickly. Secondary inspections, when necessary, could use the location information as a starting point.

Some attempted solutions at directional detection include "gamma cameras" involving collimators such as pinhole or multi-channel collimators, or coded-aperture masks. Such detectors are notoriously inefficient since most of the gamma rays are absorbed in the collimator. Other attempted solutions use paired or elongate detector elements, which generally provide low efficiency and poor angular resolution, and require time-consuming iterative rotations to find the source. Even lower efficiency is characteristic of double-scattering type detectors that rely on measuring two Compton scatterings for directional gamma ray detection, or two proton-recoil scatterings for neutrons.

What is needed is a compact, rugged, efficient detector that indicates the specific direction of the source of gamma rays or neutrons without extensive searching or iteration. Preferably the new detector would have sufficient sensitivity to detect even well-shielded nuclear weapons, and sufficient angular precision to localize the source among clutter and obfuscation, rapidly, with high efficiency, and at low cost.

SUMMARY

Disclosed herein are systems for the detection and localization of a radioactive source. In an exemplary aspect, a system is described. In one embodiment, the system includes two slab-shaped shields, two side detectors, a middle detector, and a processor. The shields may be separated by a predetermined distance, and may be oriented parallel to a centrally positioned aiming plane, and may be configured to block most particles incident orthogonally thereon from the source. The side detectors may be positioned parallel to the shields, each side detector being positioned proximate to an exterior face of a respective one of the two shields. The middle detector may be positioned between the shields, closer to the front than the back of the system, and oriented perpendicular to the aiming plane. The side detectors and the middle detector may be configured to detect particles from the source and to emit signals upon detecting the particles. The processor may be configured to calculate the angle of the source relative to the aiming plane, based at least in part on the signals from the side detectors and the middle detector.

These and other embodiments are described in further detail with reference to the figures and accompanying detailed description as provided below.

DETAILED DESCRIPTION OF INVENTION

Figure 1:
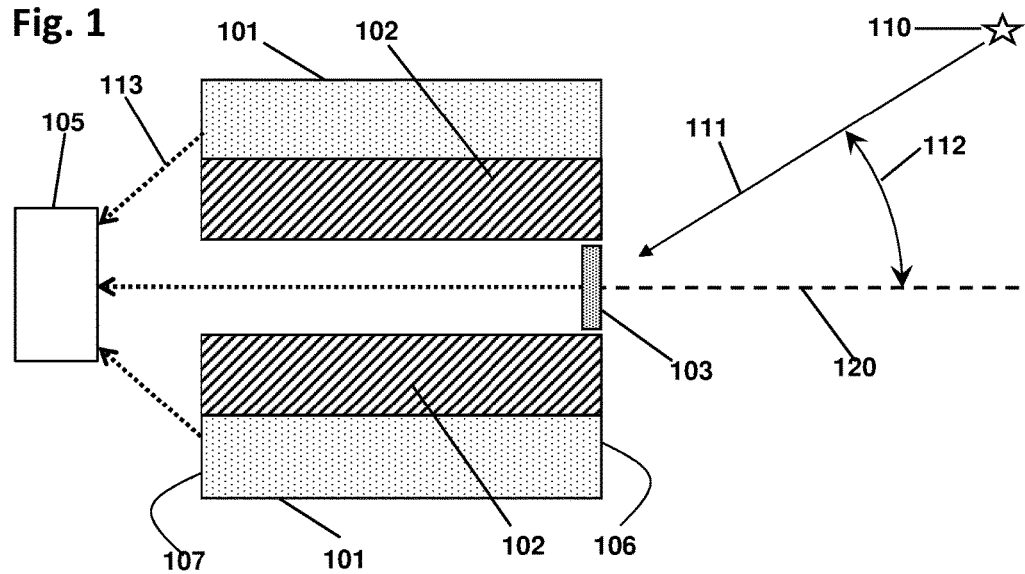
FIG. 1 is a sketch in cross-section of an exemplary system according to the disclosure comprising two side detectors, two shields, and a middle detector according to some embodiments.

In the following description, reference is made to the accompanying drawings in which it is shown by way of illustration specific embodiments in which the invention can be practiced. Not all of the described components are necessarily drawn to scale in order to emphasize certain features and to better facilitate the reader's conception of the disclosed embodiments. It is to be understood that other embodiments can be used and structural changes can be made without departing from the scope of the embodiments of disclosed herein.

Disclosed herein are systems and methods for detection and localization of nuclear and radiological weapons, their radioactive components and materials, and other radiation sources that are to be located. In some embodiments, a directional radiation detection system ("the system") can be configured to detect gamma rays or neutrons (the "particles") from a radioactive source, and to determine the direction of the source, relative to the system, in one dimension. Embodiments of the system can determine both the sign and magnitude of the source angle, based deterministically on particle data acquired at a single orientation of the system, with high detection efficiency and superior angular resolution. Examples are presented for detecting gamma rays and/or neutrons, but the principles disclosed herein are readily applicable to any particle type. In any application involving detection of clandestine radioactive threats, the ability to rapidly determine the source direction is an enabling improvement.

In some embodiments, the system may comprise two spaced-apart slab-shaped shielding barriers (the "shields") positioned facing each other and parallel to an "aiming plane" that runs centrally between the shields from the back to the front of the system, two slab-shaped particle detectors (the "side detectors") positioned exteriorly and parallel to the shields, a third slab-shaped detector (the "middle detector") positioned between the shields, and an electronic processor. The shields may be spaced apart by a predetermined "shield separation distance." In some embodiments the shields may be configured to block most (at least 50%) of the particles orthogonally incident on each shield. The side detectors may be positioned on opposite sides of the system and closely proximate to the exterior surfaces or faces of the shields respectively, wherein the exterior surface of each shield is the shield surface which is farthest from the center of the system. The middle detector may be perpendicular to the aiming plane, parallel to the front of the system, and positioned closer to the front than the back of the system. The side detectors and the middle detector (collectively the "detectors") may be configured to detect the particles and responsively emit distinct signals. The "signals" may comprise light pulses or electronic pulses or accumulated charge or counting rates or electrical voltages or currents or other detection data related to interactions of the particles, or their secondaries, in the detectors. As used herein, signals are "distinct" if they can be uniquely associated with a particular detector, thereby indicating which of the detectors detected each particle. For example, two electrical pulses on separate cables or conductors are distinct, two electronic pulses on the same conductor but with detectably different pulse shapes are distinct, two light pulses on separate light guides are distinct, and two light pulses having detectably different wavelengths are distinct, since in each case the signals can be analyzed and tallied separately. The processor may be configured to analyze the signals and to calculate the source angle based at least in part on the signals, wherein the "source angle" is the angle between the aiming plane and a line from the center of the system to the source location. For each detector, the processor may determine a "counting rate", equal to the number of particle detections in each detector within a particular time interval. In addition, the system may include a "midplane" comprising a centrally positioned plane, orthogonal to the side detectors, orthogonal to the shields, orthogonal to the aiming plane, orthogonal to the middle detector, and parallel to the back-to-front direction of the system. The "thickness" of a slab is its smallest dimension; the "length" of a slab is its longest dimension; the "width" of a slab is its intermediate dimension.

In some embodiments, the angular sensitivity of the middle detector may be determined by its shape, its orientation perpendicular to the side detectors, and the partial collimating effect of the shields. The angular sensitivity of the side detectors may be determined by their shape, their orientation parallel to the shields, and the blocking effect of the shields which admit particles from only one side according to some embodiments. Consequently, the side detectors may have oppositely directed, antisymmetric angular sensitivities, while the middle detector may have a symmetrical angular sensitivity, relative to the aiming plane. The angular correlation function may exploit these different angular sensitivities, thereby relating the source angle to a formula or analysis of the detection data of each detector. By this means, the system can determine the sign and magnitude of the source angle from data acquired at a single orientation.

FIG. 1 is a cross-section sketch of an embodiment of the system including two side detectors 101 (shown in light stipple), two shields 102 (in diagonal hatch), a middle detector 103 (dark stipple), and a processor 105. The system is facing to the right in this view and in all the figures unless otherwise noted. Also shown is the aiming plane 120 as a dashed line, since it is viewed edge-on in this cross-section view. The front is indicated as 106, and the back is 107. The midplane is not shown because it lies in the plane of the paper. A source 110 is indicated by a star, and a particle trajectory 111 as an arrow. The source angle 112 is indicated as an arc. The middle detector 103 is closer to the front 106 than the back 107. Signals 113, depicted as dotted arrows, flow from each detector 101 and 103 to the processor 105 for analysis. The processor 105 may comprise digital electronics, and optionally analog electronics, configured to calculate the source angle 112 from the signals 113 using a predetermined angular correlation function.

The particle 111 may be a neutral particle such as a gamma ray or a neutron, or it may be a charged particle such as an electron or a proton. The side detectors 101 and the middle detector 103 may be of any type suitable for detecting the particle 111, such as scintillators, semiconductor detectors, and gaseous ionization tubes. Scintillators include organic types such as stilbene or polyvinyltoluene (PVT) based scintillators of which many varieties are available, or inorganic types such as NaI, CsI, BGO, LYSO and many others, typically viewed by light sensors such as photomultiplier tubes, photodiodes, or microchannel plate sensors. Semiconductor detectors include n-type or p-type reverse-biased junctions, typically amplified by pulse amplifiers and other electronics. Gaseous ionization tubes include Geiger, proportional, and other types of tubes and chambers in which ionization charges are electrostatically collected in a gas and amplified by further electronics. In some embodiments, the sensor may be included in the associated detector, such as a semiconductor detector with an amplifier built-in. In other embodiments, the sensor may be included in the processor or other electronics connected to the detector. The shields 102 may comprise any material suitable for blocking the particle 111 from passing therethrough. If the particle 111 is a gamma ray, the shields 102 preferably comprise a high-Z, high-density material such as lead, tungsten, bismuth and the like, Z being the atomic number. If the particle 111 is a neutron, the shields 102 preferably comprise a hydrogenous material such as HDPE or PMMA containing a neutron-absorbing material such as lithium or boron.

In some embodiments, each shield 102 may comprise a substantially planar, slab-like shape of material configured to block most of the particles 111 incident orthogonally on the shield 102. Specifically, each shield 102 may be thick enough that over 50% of the orthogonally incident particles 111 are absorbed or stopped or attenuated or degraded, such that a downstream detector 101 is unable to detect the particles 111 or their secondary particles. Secondary particles are particles generated by interactions of the incident particle 111, such as Compton electrons or photoelectrons from gamma ray interactions, or alpha particles or triton particles from neutron capture events, or recoil protons from neutron scattering events. Since most of the particles 111 strike the shield 102 at some angle other than orthogonal, the particles 111 on average encounter a tangentially longer distance traversing the shield 102, such as typically 2 to 3 times the thickness of each shield 102, thereby resulting in an average attenuation of 80%-90% for each shield 102 and 96%-99% for the pair of shields 102 together.

Thicker shields 102 provide greater attenuation and thus greater isolation between the side detectors 101, but preferably the shields 102 are not so heavy that precise handling is difficult. Therefore, the shield 102 thickness may be a compromise between the isolation desired versus the weight of the system. In some embodiments, the shields 102 may be configured to block only 10% or 20% or 30% or 40% of the orthogonally incident particles 111, thereby saving substantial weight while still providing sufficient isolation between the side detectors 101 to enable the source angle 112 determination.

The detectors 101 and 103 may be configured to detect gamma rays. For example, the side detectors 101 may comprise low-cost plastic scintillator material, while the middle detector 103, being much smaller and thinner, may be made from a high-density scintillator such as $CdWO_4$ or BGO. Although inorganic scintillators often cost more than plastic, the higher detection efficiency of the denser material partially compensates for the small volume of the middle detector 103, resulting in faster localization of sources. Alternatively, the detectors 101 and 103 may comprise semiconductors such as reverse-biased planar diodes, or they may comprise gaseous ionization tubes or chambers configured to detect gamma-generated electrons by ionization of the gas, such as Geiger or proportional tubes. The shielding for gamma rays may comprise a high-Z, high-density material such as tungsten, lead, bismuth, or uranium for example, or it may comprise other materials such as leaded glass or steel if sufficiently thick to block a sufficient fraction of the gamma rays.

The detectors 101 and 103 may be configured to detect neutrons. For example, the detectors 101 and 103 may comprise neutron-specific gamma-blind scintillators such as ZnS coupled with a lithium or boron converter material, or microbeads of self-transparent neutron-specific scintillator such as Li-glass or borosilicate glass scintillator, all embedded in a transparent hydrogenous matrix such as PMMA (polymethylmethacrylate). Alternatively, the detectors 101 and 103 may comprise a thin semiconductor type detector coated with a neutron-capture nuclide such as boron or lithium, such that the ions emitted by the capture nuclide may pass into the semiconductor. As a further alternative, the detectors 101 and 103 may comprise gaseous ionization detectors such as proportional chambers or Geiger tubes filled with a gas such as $^3He$ or $BF_3$, or coated on the interior surface with boron or lithium. Shields 102 for neutrons may comprise a hydrogenous material such as HDPE (high-density polyethylene), preferably loaded with a capture nuclide such as Li or B.

In some embodiments, the dimensions of the middle detector 103 may determine its detection efficiency and may also determine the calculation of the source angle 112. In a preferred embodiment, the width of the middle detector may be at least six times the thickness, and the length may be at least three times the width. For example, the size of the middle detector 103 in the direction perpendicular to the aiming plane may be at least six times the size of the middle detector 103 in the back-to-front direction, and the size of the middle detector 103 in the direction perpendicular to the midplane may be at least three times the size of the middle detector 103 in the direction perpendicular to the aiming plane. Such a configured middle detector 103 may provide higher detection sensitivity for particles from the front than the side, and may thereby result in a monotonic angular correlation function that can be used in the source angle 112 determination.

In some embodiments, the position of the middle detector 103 relative to the shields 102 may affect the angular sensitivity of the middle detector 103, due to the partial blocking action by the shields 102 for particles 111 arriving from higher angles. In one embodiment, the middle detector 103 may be positioned flush with the front 106, such that the front surface of the middle detector 103 is substantially coplanar or coterminous with the front surfaces of the shields 102, wherein "substantially coplanar" means coplanar within a small distance such as within $1/10$ or $1/4$ or $1/2$ times the thickness of the middle detector 103. In another embodiment, the middle detector 103 may be recessed from the front 106, such that the front surface of the middle detector 103 is placed rearward relative to the front surfaces of the shields 102 by a "recess distance." In some embodiments, the recess distance may be 0.5 to 1.5 times the shield separation distance. In some embodiments, the sensitivity distribution of the middle detector 103, as modified by the shields 102, may result in an angular correlation function that extends approximately linearly for source angles 112 ranging from zero to ±90 degrees, thereby enabling localization of the source 110 throughout the front half-space.

Some room-temperature semiconductor detectors are disk-shaped. In some embodiments, the middle detector 103 may comprise a plurality of separate disk-shaped semiconductor detectors, arranged in a vertical array that approximates the shape of a slab facing the front 106. The data from the various semiconductor detectors may be added or otherwise combined to produce an overall signal 113 that indicates when a particle 111 is detected anywhere in the array. An advantage of such an array is that semiconductor detectors are typically very thin, and therefore satisfy a preferred feature that the middle detector 103 be thin. Also, semiconductor detectors require no bulky phototubes or high voltage, a further advantage since space is generally limited in the vicinity of the middle detector 103.

Conventional detectors typically have a longitudinal ambiguity, in which they cannot determine whether the source 110 is in front or behind due to symmetry. Embodiments of the presently disclosed system have no such defect. For example, the embodiment of FIG. 1 breaks the longitudinal ambiguity since the middle detector 103 is closer to the front 106 than the back 107, and therefore has a higher counting rate, relative to the side detectors 101, when the source 110 is in front of the system, and a lower counting rate when the source 110 is behind the system. The processor 105 may be configured to determine whether the source 110 is in front or behind the system by calculating the sum of the two side detector 101 rates, dividing the middle detector 103 rate by that sum, and then comparing that result (or its inverse) to an expected range of values for a source 110 being in front or behind the system.

In some embodiments, the side detectors 101 may substantially cover or enclose the exterior surfaces of the shields 102, except for the shield edges and a small optional protrusion distance as discussed below. Enclosing the shields 102 in active detector material can result in high efficiency since nearly all of the arriving particles 111 encounter the side detectors 101 first, before reaching any shielding material. In contrast, conventional detectors generally include collimators or baffles with large exposed "dead" areas, resulting in many particles 111 being blocked without detection, and hence low overall efficiency.

In some embodiments, the side detectors 101 may comprise ionization-density-dependent detectors such as PSD (Pulse-Shape Discriminating) scintillators, thereby providing separate simultaneous determinations of gamma ray and neutron interactions according to their different pulse shapes. By separately analyzing the gamma and neutron interactions, the system can determine the locations of a gamma ray source and a neutron source simultaneously. This may be a crucial advantage in a situation where an adversary attempts to confuse a radiation scan by placing a benign gamma ray emitter near a clandestine weapon.

The processor 105 may comprise a digital calculating device such as a microcontroller or CPU or GPU or logic array or the like, configured to process the detector output signals 113 and determine the location of the source 110. The processor 105 may be embedded in the system, or it may be mounted externally, or there may be multiple separate processors such as an embedded microcontroller internal to the system communicating with a facility computer elsewhere. In some embodiments, the processor 105 may be programmed to perform one or more of the angular analysis methods detailed herein, and further configured to indicate the calculated source angle 112 using a human-readable display or indicator and/or store the results in a non-transitory computer-readable record and/or transmit the results to an external computer.

To consider a specific example adapted to detect 1 MeV gamma rays, the side detectors 101 may be PVT plastic scintillator with a thickness of 15 mm and a width (in the back-to-front direction as depicted) of 60 mm. The length (going into the page as depicted) of the side detectors 101 may be 150 mm for a portable unit. For a large installation such as a cargo scanner, the length of the side detectors 101 may be much larger, up to four meters (assuming the scintillation light is collected efficiently). Such a tall detector can scan an entire vehicle or inspection zone at once.

The middle detector 103 may be, for example, a $CdWO_4$ scintillator with dimensions 3 mm thick by 30 mm wide, and a height equal to that of the side detectors 101. The middle detector 103 may be oriented perpendicular to the side detectors 101, and perpendicular to the shields 102, and parallel to the front 106 of the system. In the depicted embodiment, the recess distance is zero, which means that the front surface of the middle detector 103 is flush or coplanar with the front surfaces of the shields 102 on the front 106 of the system.

The shields 102 may be spaced apart by 30 mm to accommodate the middle detector 103. For shielding gamma rays, the shields 102 may be lead, with a thickness of 15 mm and a width of 60 mm. Such shields can provide 55% attenuation of 1 MeV gammas at orthogonal incidence, according to an MCNP6 simulation. The detection threshold in the simulation was set at 100 keV, meaning that a scattered gamma ray exiting the shield would not be detected if it had less than 100 keV of energy.

As a second exemplary embodiment, the particle 111 may be a neutron such as a low-energy (thermal or epithermal, $E<1$ eV) neutron. The side detectors 101 may be gaseous ionization tubes such as proportional chambers containing a neutron-capture gas such as $^3$He or $BF_3$ or other arrangement of neutron-capture nuclei. The middle detector 103 may be an ion-implanted or surface-barrier type semiconductor detector including LiF or $B_4C$ internally or as a thin layer, to promote neutron capture reactions generating energetic ions. The shields 102 for the neutron application may be HDPE with 5% addition of LiF, which may further moderate and absorb the neutrons.

As a third exemplary embodiment, the particle 111 may be a 1 MeV neutron, the side detectors 101 may be HDPE containing ZnS-coated optical fibers to detect recoil protons, or PMMA containing microbeads of a transparent scintillator for the same purpose.

The processor 105 may be configured to calculate the source angle 112 from the various detector rates. For example, the processor may first accumulate detection data such as counting rates from the detectors 101 and 103 for a period of time, and then calculate a differential equal to the detection rate of one of the side detectors 101 minus the detection rate of the other side detector 101. Then the processor 105 may divide the differential by the detection rate of the middle detector 103, thereby obtaining a ratio. Next, the processor 105 may use a predetermined angular correlation function that takes the ratio value as input and estimates the source angle 112 as output. In this way, the processor 105 may determine the source angle 112 from a single set of detection data, without iterations or rotations.

Cosmic rays are energetic particles, mostly muons at sea level, traveling generally vertically through the atmosphere, resulting in a background counting rate in each detector. In the usual orientation of the system, for measuring the horizontal angle of the source 110, the side and middle detectors 101 and 103 are vertical and therefore are hit by fewer cosmic ray particles than if they were horizontal. In addition, each cosmic ray particle is likely to pass through an extended region of the detector 101 or 103, and therefore to deposit a lot of energy, resulting in large pulses 113 that can be rejected on the basis of pulse height alone. For example, a scintillator may have a vertical dimension of between 5 and 15 cm which would be typical for a small device, and with a thickness of typically 1-2 cm. Depending on the cosmic ray angle, the path of the cosmic ray through the scintillator is substantially more than the thickness, such as at least 3 cm typically. Most cosmic rays drop energy at a rate of about 2 MeV per gram/$cm^2$ of material traversed, or at least 6 MeV in 3 cm of plastic scintillator of density about 1 gram/$cm^3$. Most of the gammas from nuclear weapon materials are much lower in energy, typically 1-2 MeV. Therefore, even with the relatively poor energy resolution of plastic scintillators, most of the cosmic rays can be rejected by a threshold cut at 3 MeV.

As a further background reduction, any events that trigger more than one detector 101 or 103 may be vetoed or rejected. Cosmic rays usually travel all the way through the system and thus are likely to hit more than one detector 101 or 103. Such a coincidence veto can eliminate many cosmic rays. As an additional advantage, the coincidence veto can also eliminate events in which neutron or gamma ray scatters in one side detector 101, penetrates the shields 102, and then scatters in the other side detector 101.

Figure 2:
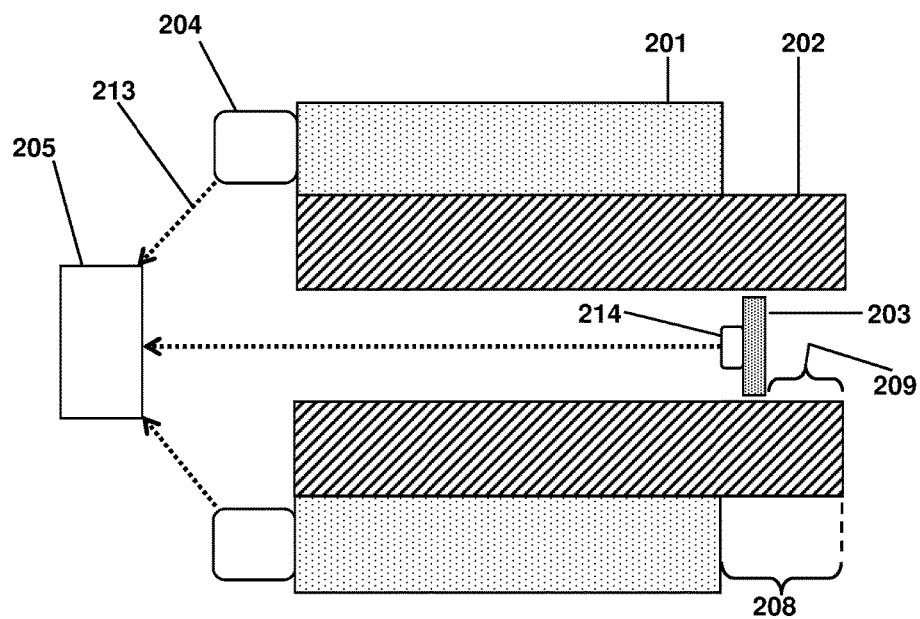
FIG. 2 is a cross-section sketch of an exemplary system with shield protrusion and with light sensors conveying data to a processor according to some embodiments.

FIG. 2 shows a cross-section view of an embodiment of the present system with improvements. Two side detectors 201 are shown flanking two shields 202, which surround the middle detector 203. The side detectors 201 and the middle detector 203 are scintillators in this example. Light sensors 204 such as phototubes can view the side detectors 201, and a photodiode light sensor 214 can view the middle detector 203. Signals depicted as dotted arrows 213 are passed from the light sensors 204 and 214 to a processor 205 for analysis. In the embodiment depicted, the shields 202 protrude frontward beyond the side detectors 201 by a protrusion distance 208 (which in this case is 25 mm). The middle detector 203 is shown recessed from the front of the shields 202 by a recess distance 209, which in this example is 15 mm. In some embodiments, the angular correlation function depends on the shape and recess distance 209 of the middle detector 203. The light sensors 204 and 214 may be mounted on the rear surface of each detector 201 and 203, thereby avoiding material in the way of incident particles that may arrive from the front half-space.

In an embodiment wherein the shields 202 protrude frontward beyond the side detectors 201, the shield protrusion distance 208 may be related to the thickness of the side detectors 201, such as 0.5 to 1.5 times the thickness of the side detectors 201, and often the protrusion distance is substantially equal to the side detector thickness (such as 0.9-1.1 times the side detector thickness). Such a shield protrusion 208 may enhance the isolation of the side detectors 201, and may also provide improved angular resolution by blocking particles that arrive from various angles. For example, the shield protrusion 208 may be configured to prevent particles that arrive at an angle of 45 degrees from passing in front of the shields 202 and striking the downstream side detector 201.

The processor 205 may include analog signal processing electronics such as amplifiers, electronic filters, pulse-height discriminators, pulse-shape analyzers and the like, as well as digital computing electronics capable of performing calculations according to a method such as the various analysis methods detailed herein. In some embodiments, the method may include counting the pulses from each detector for a particular time interval, performing arithmetic operations to derive the source angle from the data, and indicating or transmitting or otherwise reporting the results. Microcontrollers of many different types, CPUs and GPUs, gate arrays and ASICs of many types may be used for this purpose according to various embodiments.

Figure 3:
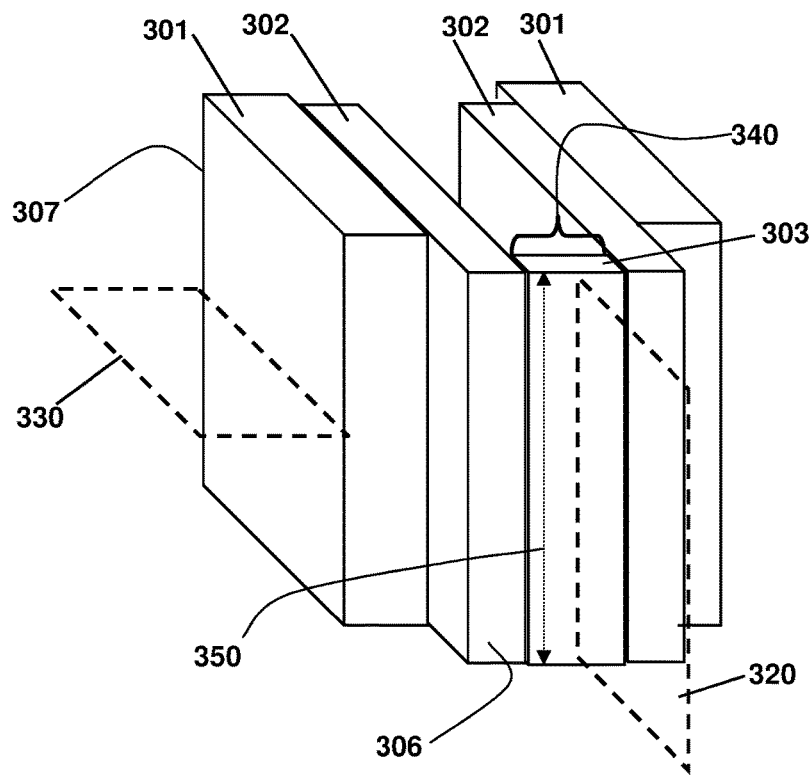
FIG. 3 is a sketch in perspective of an exemplary system facing out of the page according to some embodiments.

FIG. 3 is a perspective sketch of the embodiment of FIG. 2 but with the middle detector 303 now flush with the front 306 of the shields 302. The system is pointing out of the page, generally toward the viewer's right side. The depicted embodiment comprises two side detectors 301 mounted outside and proximate to two shields 302, and a middle detector 303 mounted between the shields 302. The aiming plane 320, shown in dash, is the centrally positioned plane of symmetry parallel to the shields 302. The midplane 330 is a plane passing centrally through the system, perpendicular to the aiming plane 320, perpendicular to the side detectors 301, perpendicular to the shields 302, and perpendicular to the middle detector 303. The shields 302 and the side detectors 301 are parallel to the aiming plane 320 which passes centrally between the shields 302. The middle detector 303 is oriented perpendicular to the aiming plane 320, perpendicular to the shields 302, perpendicular to the side detectors 301, perpendicular to the midplane 330, and parallel to the front 306 of the system. The back of the system is indicated as 307. The width of the middle detector 303 is indicated by a curly brace 340, and the height or length of the middle detector 303 is indicated by an arrow 350.

The middle detector 303 can be positioned to have a symmetrical angular sensitivity distribution peaked in the forward direction. In contrast, the side detectors 301 can have antisymmetric angular sensitivities relative to the aiming plane 320. As a result of this difference in angular sensitivities, there exists an angular correlation function that quantifies the correlation between the source angle and the detection rates.

Figure 4:
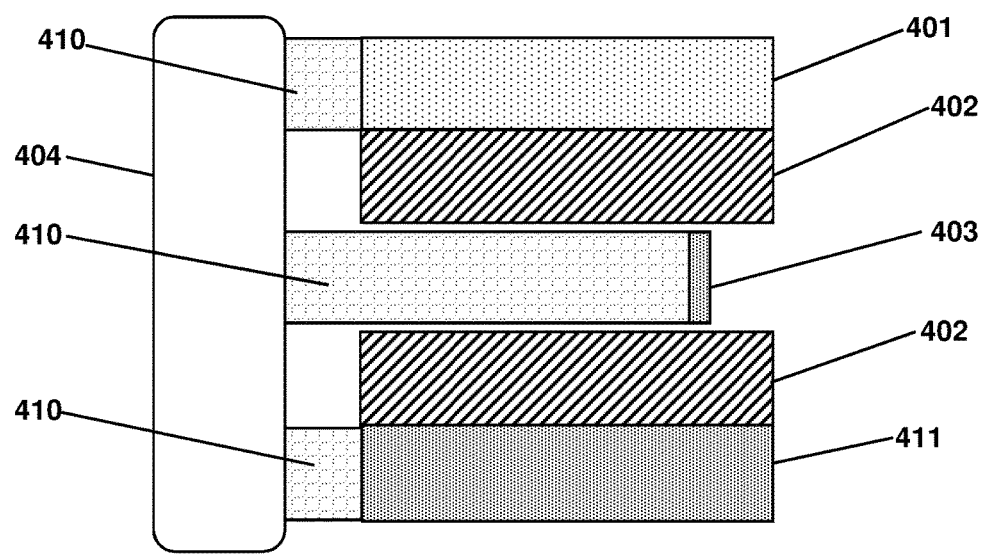
FIG. 4 is a cross-section sketch of an exemplary system with detectors comprising three scintillators of different types and a shared light sensor according to some embodiments.

FIG. 4 is a cross-section sketch of an alternative embodiment of the system in which the two side detectors 401 and 411 comprise two different scintillator materials emitting different pulse shapes. For example, the first side detector 401 (light stipple) may be PVT and the other side detector 411 (dark stipple) may be BGO, which have pulse decay times of 5 ns and 300 ns respectively. Likewise, the middle detector 403 may comprise yet a third scintillator material with a distinct pulse shape, such as CdWO$_4$ with a 14-microsecond decay time. A single light sensor 404, such as a large-diameter phototube, may view both side detectors 401 and 411, and also the middle detector 403, through light guides 410 (light grid hatch). Thus, the signals from the various detectors are distinct in that they can be separated according to pulse shape, thereby determining which detector detected each particle. In addition, a precalibrated detection efficiency and/or a predetermined background rate may be applied as corrections for each detector. The configuration may be economical since only a single light sensor 404 is needed.

The configuration shown has zero shield protrusion, since the side detectors 401 and 411 are coterminous with the shields 402. The lack of a shield protrusion can provide more detection area and therefore higher detection efficiency over a wide range of source angles, but also can result in reduced contrast or particle isolation between the two side detectors 401 and 411 when the source angle is intermediate (such as 45 degrees) due to particles passing by the shields 402 and striking the downstream side detector 401 or 411. Designers can choose the amount of shield protrusion according to the relative importance of wide-angle efficiency versus narrow-angle resolution.

Figure 5:
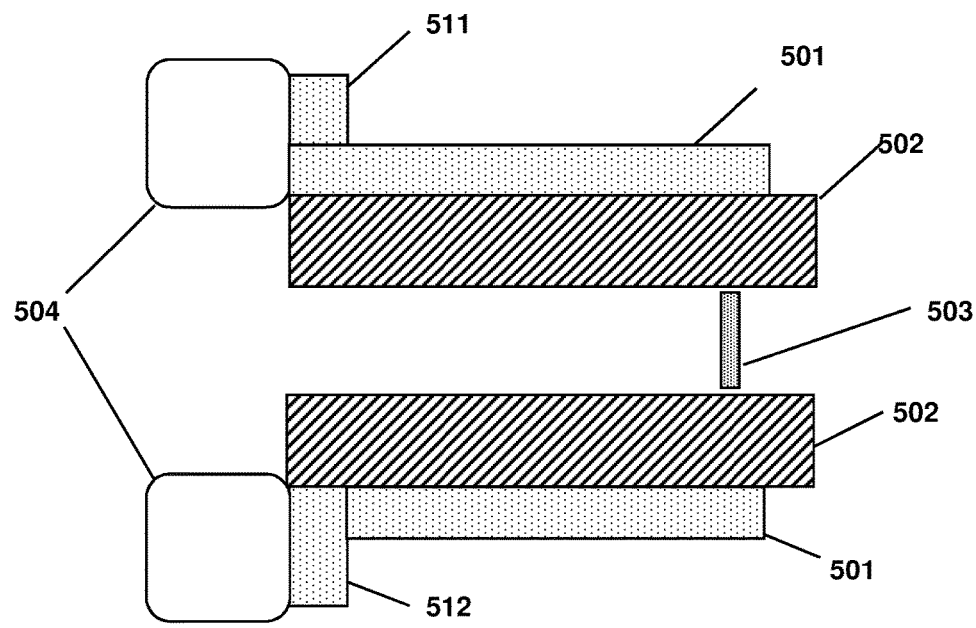
FIG. 5 is a sketch in cross-section of an exemplary system with the addition of detector back-flanges according to some embodiments.

FIG. 5 is an embodiment of the system including detector back-flanges 511 and 512. Here the side detectors 501 are rather thin, comprising a high-density scintillator material such as LYSO for example. LYSO has a high detection efficiency for gamma rays, and therefore a thin layer may be sufficient to detect incoming gamma rays from most angles. However, when the system is brought into alignment with a gamma ray source, very few gammas are observed in the thin side detectors 501 due to the small area presented edge-wise to the gamma ray source. That could make it difficult to determine when the source is aligned with the aiming plane by comparing the counting rates in the two side detectors 501. To provide additional detection area when the system is aimed at the source, the back-flanges 511 and 512 can be mounted on the rear portions of the two side detectors 501. The back-flanges 511 and 512 may extend laterally (away from the shields 502) beyond the adjacent side detectors 501 by a distance, which is preferably at least equal to the thickness of the adjacent side detectors 501, and may be larger. Thus, the back-flanges 511 and 512 may provide extra detection area when the system is aligned with the source.

The figure shows one back-flange 511 comprising a segment mounted onto the exterior surface of a side detector 501, and a second back-flange 512 comprising a larger segment mounted behind the adjacent side detector 501 according to some embodiments. As another option, the side detector 501 and its back-flange 511 or 512 may be made as a single L-shaped part. All of these options perform similarly. Each light sensor 504 can view one side detector 501 and its back-flange 511 or 512 together. Also shown are shields 502 and a middle detector 503.

While the detector materials listed in this example are mainly scintillators applicable to gamma rays, the same principles may be used for improving the low-angle detection efficiency of high energy or low energy neutrons using suitable neutron-sensitive detector materials and/or other detector types. For example, a low-energy neutron detector based on neutron capture in a thin layer of B or Li, which is proximate to an ionization chamber or thin scintillator, may have even thinner dimensions than indicated in the figure, and thus would benefit from back-flanges to detect low-energy neutrons from sources near zero degrees.

Figure 6:
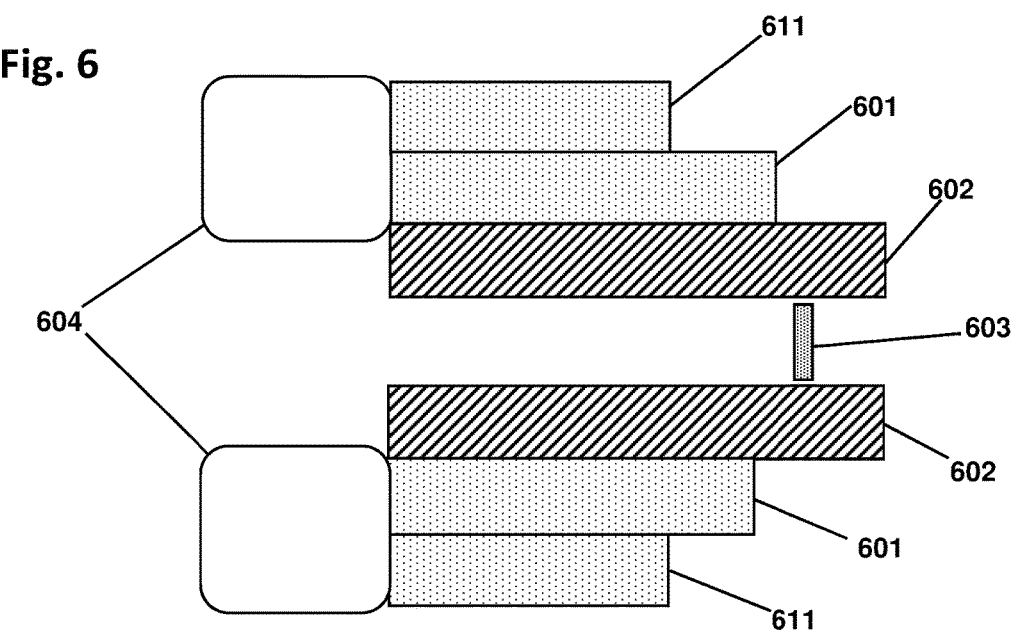
FIG. 6 is a sketch in cross-section of an exemplary system with outriggers to augment the detection efficiency according to some embodiments.

FIG. 6 shows another embodiment of the system, now with outriggers 611, comprising detector panels mounted adjacent to the exterior surfaces of the side detectors 601. The outriggers 611 may comprise planar slabs of detector material, which may be the same material as the side detectors 601 or a different detector material, depending on the application. A purpose of the outriggers 611 may be to increase the detection efficiency by providing more detection volume. In a preferred embodiment, each outrigger 611 may be cut shorter than the adjacent side detector 601, so as to remain in the "shadow" of the shields 602 for obliquely-arriving particles. Thus, the front end of the outrigger 611 may be substantially shortened relative to the front end of the adjacent side detector 601. The outrigger shortening distance may be related to the thickness of the outrigger 611, for example being equal to the thickness of the outrigger 611. The shortening distance of the outrigger 611 may be configured so that any particles that are shielded from hitting the side detector 601 are also shielded from hitting the outrigger 611. When so configured, the outriggers 611 may provide enhanced detection efficiency while causing little or no loss in angular resolution.

The side detectors 601, middle detector 603, and the outriggers 611, may comprise scintillators configured to detect gamma rays or neutrons. Each side detector 601 and its adjacent outrigger 611 may be viewed together by a single light sensor 604. The outriggers 611 can nearly double the detection volume. The outriggers 611 may comprise the same material as the side detectors 601 as in this example, while in other embodiments they may be different types of scintillators, or other types of detectors. The outriggers 611 are shown cut shorter than the side detectors 601, by an amount that ensures that the outrigger 611 remains shadowed by the shield 602 for particles arriving at a particular angle, such as 45 degrees. Preferably the outrigger 611 is shadowed by the shield 602 in the same way that the side detector 601 is shadowed. For example, if the outrigger 611 has the same thickness as the side detector 601, then the outrigger 611 is preferably shortened relative to the side detector 601 by the same amount that the side detector 601 is shorter than the shield 602.

Figure 7:
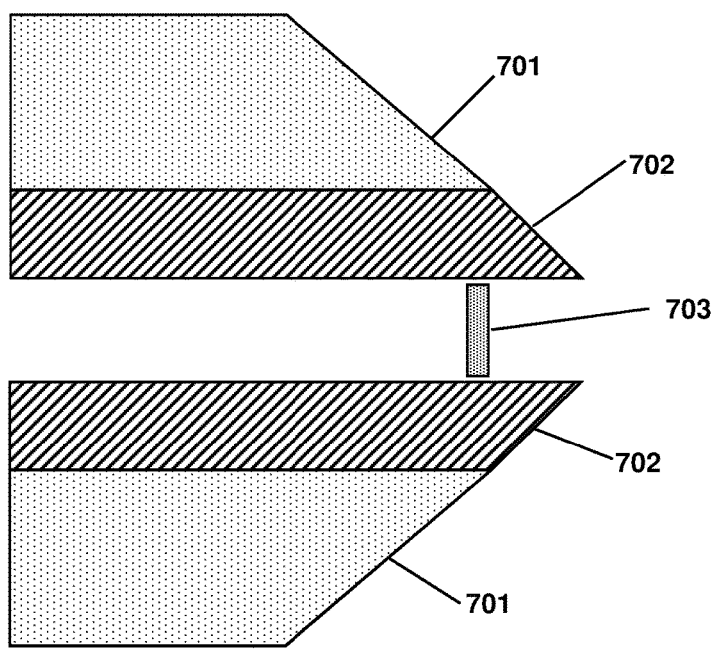
FIG. 7 is a sketch in cross-section of an exemplary system with trapezoidal side detectors and beveled shields according to some embodiments.

FIG. 7 shows another embodiment, in this case with the side detectors 701 comprising gaseous ionization chambers configured for neutron detection. Each side detector 701 is in the shape of a trapezoid as viewed from the top. The trapezoidal shape can maximize the detection volume while remaining in the shaded zone of the shields 702. Also, the shields 702 may be beveled at the same angle as the side detectors 701. The middle detector 703 may be a lithium-coated semiconductor detector in this example, mounted between the shields 702 which may comprise borated HDPE. Neutrons arriving at larger angles than the bevel angle are blocked by the shields 702 from reaching the trapezoidal side detectors 701. In some embodiments, the shields 702 may be configured to substantially match, or have the same size, as the side detectors 701 on the surface where they meet, thereby providing optimal shielding. With such shaping, the trapezoidal side detectors 701 can be made much thicker, and thereby achieve greater detection efficiency, without extending beyond the shielded zone and without sacrificing contrast between the two side detectors 701.

Figure 8:
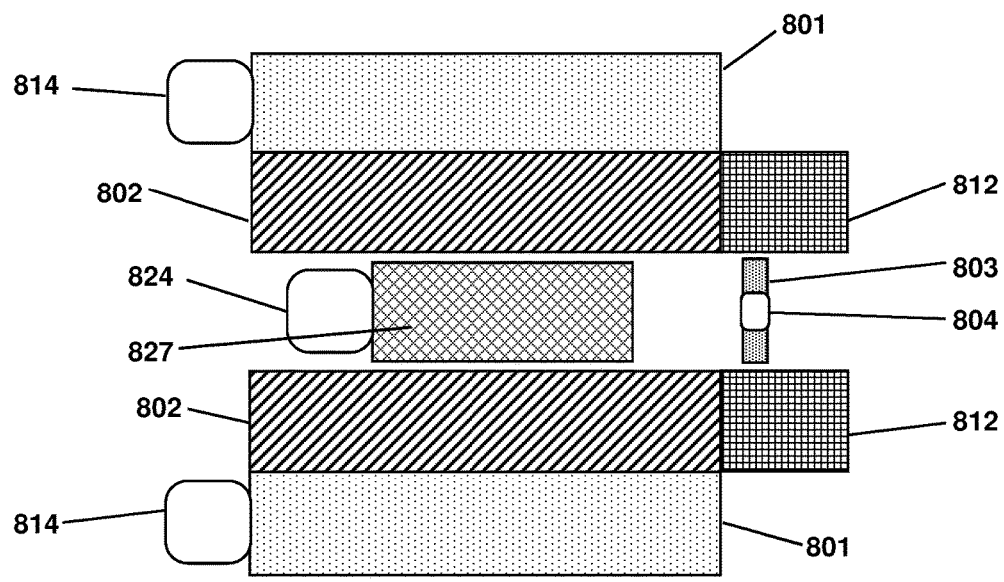
FIG. 8 is a sketch in cross-section of an exemplary system with an additional energy-resolving detector behind the middle detector according to some embodiments.

FIG. 8 is a cross-section sketch of an embodiment of the system including a fourth detector 827 positioned between the shields 802, behind the middle detector 803. The shields 802 may include shield protrusion portions 812 (small grid-hatch) comprising a different material than the rest of the shields 802. For example, the shields 802 may be lead and the protrusion portions 812 may be depleted uranium, thereby providing extra attenuation for gammas from various directions.

Also shown are a photodiode light sensor 804 viewing the middle detector 803, and phototubes 814 viewing each of the side detectors 801. The phototubes 814 are shown mounted toward the back of the system, while the photodiode 804 views the middle detector 803 from the top surface. The fourth detector 827 is read out by an appropriate sensor 824. If the fourth detector 827 is a scintillator, the sensor 824 may be a light sensor; and if the fourth detector 827 is a semiconductor or gaseous ionization detector, the sensor 824 may be an amplifier circuit.

In some embodiments, the fourth detector 827 may comprise a spectroscopic or energy-resolving detector configured to measure the energy of incoming particles that pass through the thin middle detector 803. Due to the collimation effect of the shields 802 and shield protrusions 812, the energy-resolving fourth detector 827 may detect source particles primarily when the system is aimed at the source. The energy spectrum measured by the energy-resolving fourth detector 827 may thereby identify the source isotope, based on the energies observed. According to some embodiments, the energy-resolving fourth detector 827 may be, for example, a slab of NaI or other scintillator, or an HPGe or GeLi semiconductor detector, or a gaseous ionization chamber with linear charge collection. Preferably the energy-resolving fourth detector 827 has an energy uncertainty of 10% or less, wherein the energy uncertainty may be, for example, the full-width-at-half-maximum of a full-energy peak in the energy spectrum.

In other embodiments, the fourth detector 827 may be configured to detect the same type of particle as the middle detector 803, or a different particle type. For example, the side and middle detectors 801 and 803 may be configured to detect neutrons, and thereby to determine the location of a neutron source, while the fourth detector 827 may be configured to detect gamma rays and measure the energy spectrum of the gamma rays, thereby providing additional information about the source.

As a further option, the fourth detector 827 may comprise a material that emits a first signal when traversed or partially traversed by a lightly-ionizing particle such as an energetic electron, and a second signal different from the first signal when traversed or partially traversed by a heavily-ionizing particle such as an energetic ion. For example, the material of the fourth detector 827 may comprise a scintillator such as a PSD or pulse-shape discriminating scintillator, configured to produce a first light pulse upon detecting a Compton electron, and a second light pulse different from the first light pulse upon detecting a recoil proton or an alpha or triton from a neutron-capture event. Thus the initial particle may be identified as a neutron or a gamma ray according to the ionization density of tracks within the material. Exemplary PSD scintillators include CsI(Tl) and certain plastic scintillators with a special fluor, or alternatively ZnS which is mainly sensitive to energetic ions. Such a PSD scintillator can discriminate between gamma ray events and neutron events, since recoil protons and ions from neutron capture events have a high ionization density, whereas gamma-generated electrons have a low ionization density. The pulse properties of each event in the fourth detector 827 can indicate whether the event was due to a gamma ray or a neutron. The fourth detector 827 can thus reveal a neutron source if present, while the other detectors can determine the location of the source.

Figure 9:
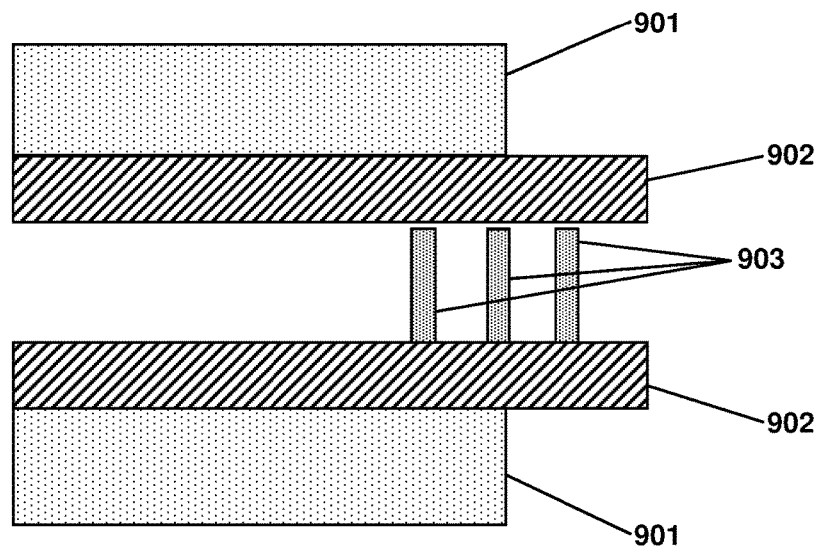
FIG. 9 is a sketch in cross-section of an exemplary system with three middle detectors according to some embodiments.

FIG. 9 is a cross-section sketch of an embodiment of the system wherein the middle detector is a member of a plurality of similar front-facing middle detectors 903, mounted sequentially between the shields 902 and closer to the front of the system than the back. Each of the plurality of middle detectors 903 may be a slab-shaped form, perpendicular to the aiming plane and to the midplane, parallel to the front of the system, and configured to detect the particles and to produce a responsive signal. A purpose of using a plurality of middle detectors 903 may be to obtain higher detection efficiency. Each detector of the plurality of middle detectors 903 can contribute data for determining the source angle.

The shields 902 in this example are configured to block only 20% of the orthogonally incident particles, which nevertheless provides sufficient isolation between the side detectors 901 because, in the intended application, most particles are expected to arrive from the front and therefore experience a tangentially longer pathlength in each shield 902.

In other embodiments, the system may include a plurality of middle detectors positioned toward the front, and a plurality of back-facing detectors positioned toward the back, and all oriented perpendicular to the aiming plane and perpendicular to the midplane. Such pluralities of middle detectors and back-facing detectors may provide enhanced detection efficiency for particles arriving from the back as well as the front.

Figure 10:
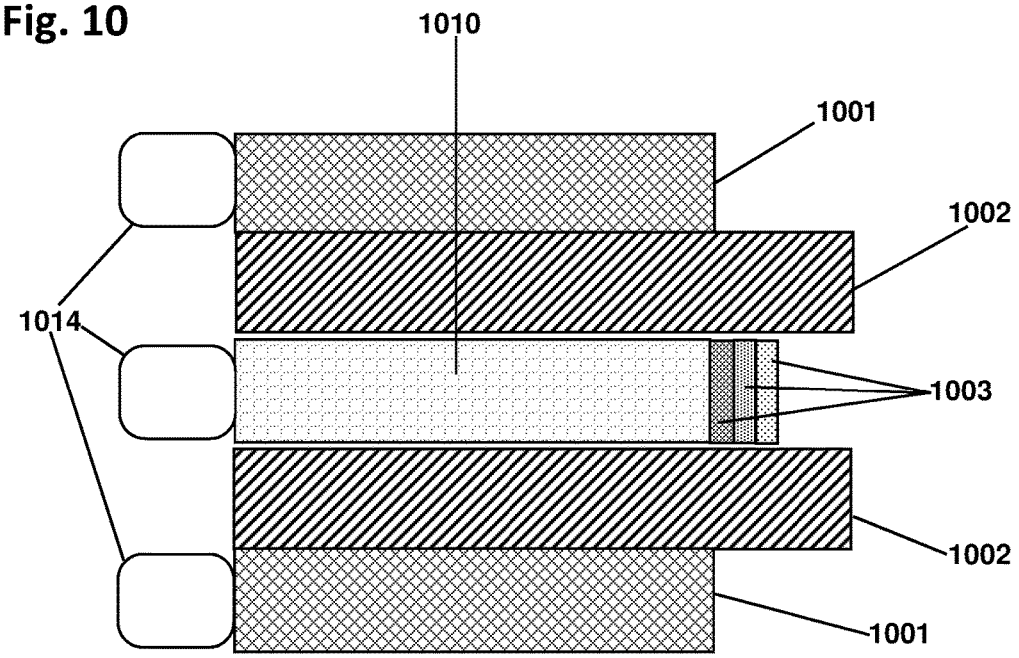
FIG. 10 is a sketch in cross-section of an exemplary system with three middle detectors comprising scintillators of different types, optically coupled together and viewed by a common light sensor according to some embodiments.

FIG. 10 shows an embodiment of the system in which the side detectors 1001 are energy-resolving scintillators (in cross hatch) surrounding the shields 1002, and wherein the middle detector is a member of a plurality of similar front-facing middle detectors 1003, each configured to detect the particles and emit a signal. The plurality of middle detectors 1003, here comprising three middle detectors 1003, are mounted between the shields 1002, closer to the front of the system than the back, perpendicular to the aiming plane and to the midplane, parallel to the front of the system, and configured to detect the particles. As indicated by different stipple densities in the figure, each member of the plurality of middle detectors 1003 comprises a different scintillator material, each such material being configured to produce a different pulse shape; hence by pulse shape analysis, each detection event can be allocated to whichever of the plurality of middle detectors 1003 was active. As shown, the middle detectors 1003 are optically coupled to each other in a "phoswich" arrangement, which is optically coupled to a light guide 1010. Light sensors 1014 may be connected to the light guide 1010 and to each side detector 1001. Thus the system can determine the source angle by analyzing signals from each of the plurality of middle detectors 1003 separately.

The side detectors 1001 in the depicted example are energy-resolving scintillators, as mentioned. Energy spectra from the side detectors 1001 may thus be used to identify the source isotope. As a further option, the light guide 1010 may be made of a transparent high-density material such as leaded glass, thereby providing additional shielding.

Figure 11:
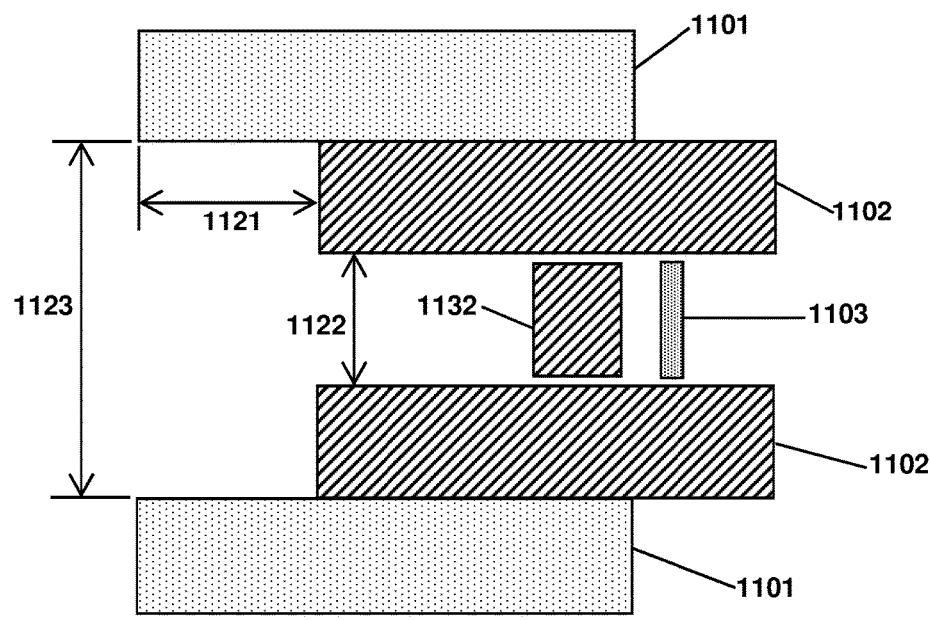
FIG. 11 is a cross-section sketch of an exemplary system in which the shields are truncated in the back region to reduce weight according to some embodiments.

FIG. 11 is a cross-section sketch of an embodiment of the system in which the shields 1102 are truncated, or cut short, relative to the back surfaces of the side detectors 1101. That is, the side detectors 1101 extend rearward beyond the shields 1102. A purpose of truncating the shields 1102 may be to save weight. The truncation distance 1121 of the shields 1102 is shown as the distance from the back ends of the shields 1102 to the back ends of the side detectors 1101. Preferably the shield truncation distance 1121 is large enough to save substantial weight, but not so large that particles can readily pass behind the shields 1102 and strike the downstream side detector 1101. For example, the truncation distance 1121 may be at least as large as the shield separation distance 1122, but no greater than the side detector separation distance 1123. With those limitations, the particle isolation between the two side detectors 1101 is nearly unaffected by the truncation, at least for source angles less than about 60 degrees. For higher source angles, such as 90 degrees, the particles can occasionally pass through and hit the wrong side detector 1101, but this is an infrequent effect that can be accounted for in the predetermined angular correlation function.

The sketch further shows an additional shield element comprising a central shield slug 1132 positioned between the shields 1102 and behind the middle detector 1103. In a preferable embodiment, the shield slug 1132 may be configured to block most of the particles orthogonally incident on it. A purpose of the shield slug 1132 is to block particles arriving from the back, so that the system can more readily determine, from the middle detector 1103 counting rates, whether the source is in front or behind. The counting rates in the side detectors 1101 are nearly the same whether the source is located in front or behind the system, and therefore the side detectors 1101 alone cannot determine which half-space the source is in. But the longitudinal ambiguity is broken by the frontward position of the middle detector 1103, as well as the shield slug 1132 which shields the middle detector 1103 from the back.

Operationally, the front-versus-back source position can be determined by dividing the counting rate of the middle detector 1103 by the sum of the two side detector 1101 counting rates according to some embodiments. If that ratio is anomalously low, the source may be determined to be behind the system. Then, using the same data, the sign of the source angle can be determined by subtracting one of the side detector 1101 counting rates from the other, thereby obtaining a differential, wherein the sign of the source angle corresponds to the left-versus-right position of the source. Then, continuing with the same data, the magnitude of the source angle can be determined by dividing the differential by the middle detector 1103 counting rate, and comparing that ratio to a predetermined angular correlation function. Thus, the system can determine the full source angle, with sign and magnitude, from the detection data.

Figure 12:
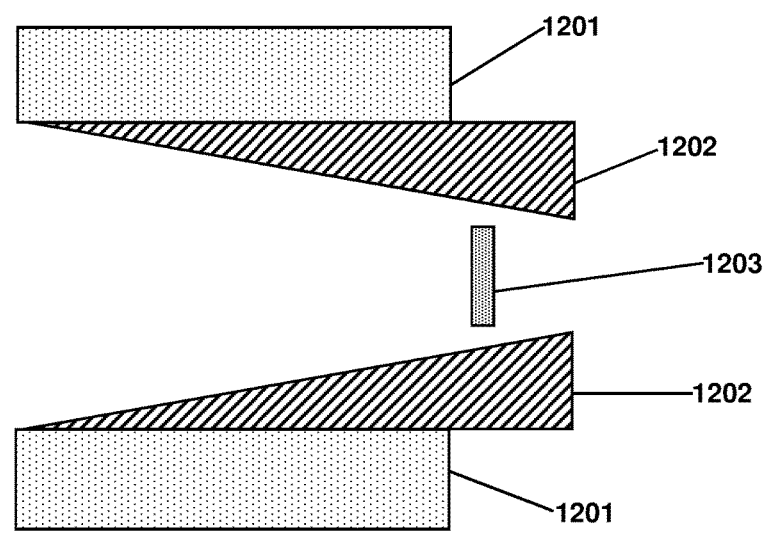
FIG. 12 is a sketch in cross-section of an exemplary system with tapered shields to reduce weight according to some embodiments.

FIG. 12 depicts an embodiment with an alternative shield configuration. Here the shields 1202 are shaped as triangles in cross-section, as viewed from the top. In the depicted case, each shield 1202 is a right triangle with one sharply pointed edge directed toward the back. Alternatively, the shields 1202 may comprise blunt triangles or narrow trapezoidal shapes or other tapered shapes, configured to tailor the amount of shielding at the back end. Allowing some amount of shielding at the back may be useful in applications where the source is expected to be at high angles relative to the aiming plane. In a preferred embodiment, the thickest region of the shields 1202 can be sufficiently thick that most of the orthogonally incident gamma rays are blocked or attenuated by the thickest region. Such "tapered" shields 1202 can provide extra shielding toward the front where it is needed for high signal contrast, and reduced thickness toward the back where it is not needed, thereby resulting in a weight reduction of about half in some embodiments. The tapered shields 1202 are most applicable in inspections where the source is unlikely to be behind the system. Side detectors 1201 and a middle detector 1203 are also shown.

Figure 13:
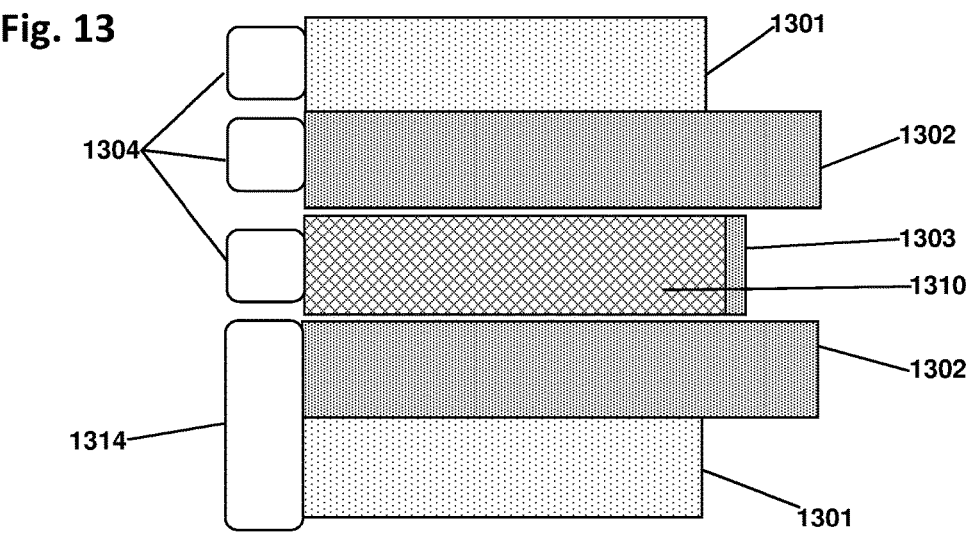
FIG. 13 is a sketch in cross-section of an exemplary system with scintillating shields and an optional scintillating light guide optically coupled to the middle detector according to some embodiments.

FIG. 13 depicts an embodiment in which the shields 1302 are made of detector material (shown in dark stipple) and are configured to emit signals upon detecting particles from the source. The two detector-shields 1302 may be configured to emit distinct signals wherein, as mentioned, distinct signals may comprise signals that indicate which detector produced each signal according to an electrical or optical property. For example, the signals may be carried on two separate conductors or cables corresponding to the two detector-shields 1302 respectively, or the signals may have a different shape or other feature corresponding to each detector-shield 1302. Such detector-shields 1302 may comprise a scintillator material that provides both shielding and detection of the particles. For gamma ray detection and shielding, the detector-shields 1302 may be a high-Z, high-density, transparent scintillating material such as BGO, LYSO, $CdWO_4$, or the like. For neutrons, the detector-shields 1302 may comprise a transparent material incorporating hydrogen and preferably a neutron-reaction nuclide such as lithium or boron, wherein the scintillator may be configured as microbeads of lithiated glass scintillator or borosilicate scintillator embedded in a polymer such as PMMA. Also shown are side detectors 1301 and a middle detector 1303 which may also be scintillators as in the example depicted. One advantage of such detector-shields 1302 may be that they can detect a weak or shielded source with high sensitivity due to their ample volume typically. The detector-shields 1302 may be thick enough to block more than 50% of the orthogonally incident particles, thereby providing sufficient particle isolation between the side detectors 1301. The detector-shields 1302 and the side detectors 1301 may be viewed by separate light sensors 1304, or they may be viewed together by a single light sensor 1314. In the latter case, the detector-shields 1302 and the side detectors 1301 preferably comprise different scintillator materials with different pulse shapes so that their signals can be separated in analysis.

In a further embodiment, the middle detector 1303 may be optically coupled to a light guide 1310 (shown in cross-hatch) which itself may comprise an energy-resolving light-guide-scintillator 1310, so long as the pulse properties of the middle detector 1303 are detectably different from pulses emitted by the light-guide-scintillator 1310. Energy-dependent signals from the light-guide-scintillator 1310 may enable isotopic identification of the gamma ray source material. As a further benefit, the light-guide-scintillator 1310 may provide extra shielding. The high-Z detector-shields 1302 and the large energy-resolving light-guide-scintillator 1310 together comprise a sensitive, high-efficiency detector combination. When aligned with the source location, the detection signals can reveal even a well-shielded weapon based on counting rates and spectroscopy alone.

In a further embodiment, the light-guide-scintillator 1310 may comprise material that produces a different pulse according to the ionization density of the particle, thereby discriminating between gamma-generated electrons and neutron-generated ions. Such an ionization-dependent light-guide-scintillator 1310 may contain hydrogen and detect fast neutrons by proton recoil detection, or it may contain Li or B compounds and detect slow neutrons according to the alphas or triton ions emitted by slow neutron capture reactions. In this way, neutron and gamma ray sources and backgrounds can be determined independently.

In some embodiments, the shields 1302 may be configured to detect the opposite type of particle from that detected by the middle and side detectors 1303 and 1301. More specifically, the middle and side detectors 1303 and 1301 may be configured to detect a first particle type, and the detector-shields 1302 may be configured to detect a second particle type different from the first particle type. For example, a detector-shield 1302 may detect neutrons while the side and middle detectors may detect gammas, or vice-versa. Such detector-shields 1302 and complementary side detectors 1301 may thereby enable detection of both neutrons and gammas simultaneously, while determining the source angle according to one of the particle types.

In other embodiments, the detector-shields 1302 may comprise an energy-resolving scintillator or semiconductor which provides information about the particle energy spectrum. The large volume of such energy-resolving detector-shields 1302 may provide sufficient data to identify the source nuclide rapidly, while at the same time the side detectors 1301 and the middle detector 1303 determine its location.

Figure 14:
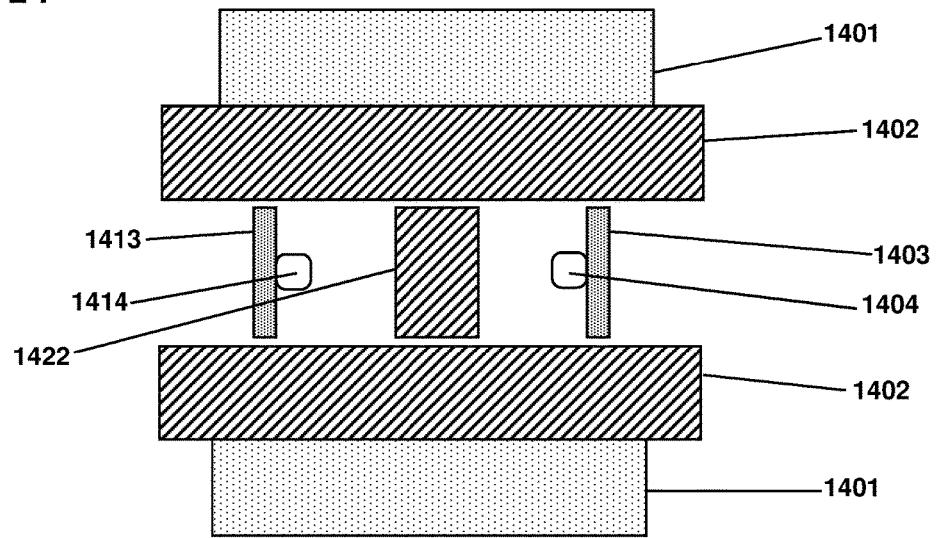
FIG. 14 is a sketch in cross-section of an exemplary system with a rear-facing detector positioned between the shields according to some embodiments.

FIG. 14 depicts an embodiment of the system with a rear-facing detector 1413 which is mounted toward the back of the system, positioned between shields 1402 and orthogonal to the side detectors 1403 and parallel to the middle detector 1403. In a preferable embodiment, the rear-facing detector 1413 may be similar in shape and performance to the middle detector 1403, perpendicular to the aiming plane and to the midplane, parallel to the front of the system, and may be configured to detect the particles and emit signals responsively. The rear-facing detector 1413 may be recessed from the back of the shields 1402 by substantially the same distance that the middle detector 1403 is recessed from the front. Also, the shields 1402 may protrude beyond the side detectors 1401 in both the front and back directions, preferably by the same protrusion distance. A shield slug 1422 may be centrally positioned. Thus, the front and back of the system can be symmetrical.

The middle detector 1403 and the rear-facing detector 1413 may, in cooperation, enable simultaneous scanning of particles from the front and back, and thereby determine the source location regardless of whether the source is in front or behind the system. The middle detector 1403 and the rear-facing detector 1413 may be viewed by two sensors 1404 and 1414, comprising photodiodes if the middle and rear-facing detectors 1403 and 1413 are scintillators, or amplifiers if the middle and rear-facing detectors 1403 and 1413 are semiconductor or gaseous ionization detectors. The sensors 1404 and 1414 may be placed in the space between the middle and rear-facing detectors 1403 and 1413, thereby avoiding placing material in the way of incoming particles from either direction. Alternatively, the sensors 1414 and 1404 may be mounted on the top and/or bottom edges of the middle and rear-facing detectors 1403 and 1413. The depicted configuration may be especially useful in applications where a source is equally likely to be anywhere around the system.

Figure 15:
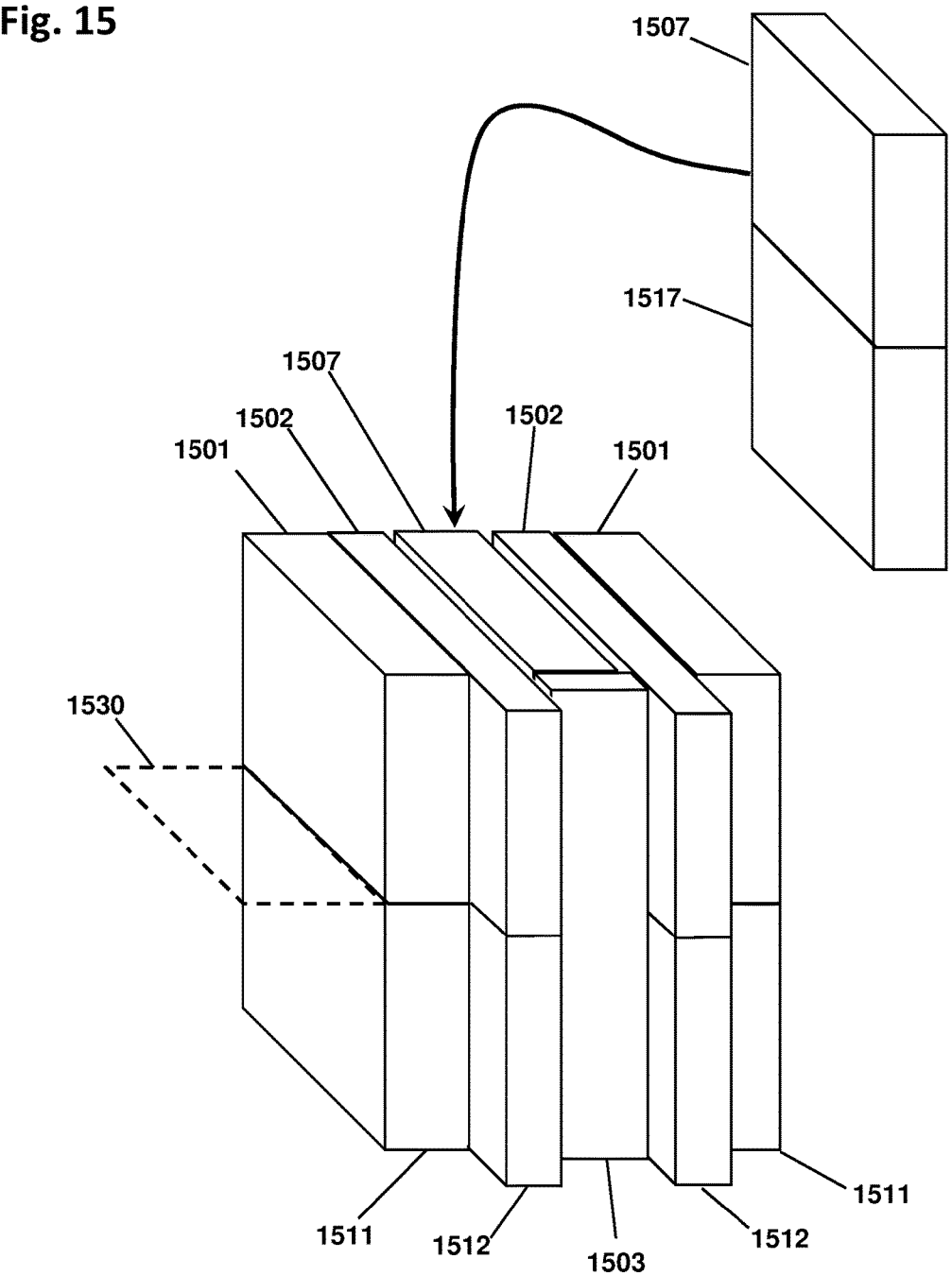
FIG. 15 is a sketch in perspective of an exemplary system with split detectors abutting at the midplane, thereby enabling the system to determine whether a source is above or below the midplane according to some embodiments.

FIG. 15 is a perspective sketch of an embodiment configured to determine whether the source is above or below or substantially on the midplane of the system, without having to turn the system on its side. In the sketch, the system is shown pointed toward the viewer's right side and out of the page. Each side detector may be split into two portions, an upper side portion 1501 and a lower side portion 1511, abutting edgewise at the midplane 1530 which is shown in dash. The upper and lower side portions 1501 and 1511 may be configured to emit signals upon detecting the particles from the source. According to some embodiments, if the source is above the midplane 1530, the upper side portions 1501 count higher than the lower side portions 1511, and vice-versa if the source is below the system. If the source is substantially on the midplane 1530, then the upper and lower side portions 1501 and 1511 may count at substantially the same rate. Thus, the system can compare signals from the upper and lower side portions 1501 and 1511 and thereby determine whether the source is above, below, or substantially on the midplane 1530, according to the ratio or difference of counts in the upper side portions 1501 versus the lower side portions 1511. As used herein, the source is substantially on a plane if the angle between the plane and the source is less than a predetermined small angle such as one degree or two degrees. As used herein, the counting rates of two detectors are substantially the same if they differ by no more than an expected variation such as one or two times the statistical uncertainty.

The embodiment shown can also determine the source angle by adding together the signals from the upper and lower side portions 1501 and 1511 on each side, so that the combined signals or counting rates effectively act as an unsplit left side detector and an unsplit right side detector. Then, the left sum may be subtracted from the right sum, thereby obtaining a differential. The differential may then be divided by the counting rate for the middle detector 1503, thereby obtaining a ratio. The ratio may then be compared to the predetermined angular correlation function to determine the horizontal component of the source location. In addition, the system may be configured to determine, when the counting rates in all four side detector portions 1501 and 1511 are substantially equal, that the system is aimed at the source both horizontally and vertically.

Alternatively, or in addition, the shields may be configured to detect the particles, as discussed with reference to FIG. 13, wherein each shield may be split into an upper shield portion 1502 and a lower shield portion 1512, abutting at the midplane 1530 in some embodiments. Detection data from the upper and lower shield portions 1502 and 1512 may then be compared or subtracted to determine whether the source is above, or below, or substantially on the midplane 1530. Thus the system may compare detection data of the upper shield portions 1502 with detection data of the lower shield portions 1512, and thereby determine whether the source is above or below or substantially on the midplane.

Alternatively, or in addition, the system may include a fourth detector, positioned between the shields 1502 and 1512, behind the middle detector 1503 as discussed with reference to FIG. 8, and may be split into an upper detector 1507 and a lower detector 1517 abutting at the midplane 1530 in some embodiments. The upper and lower detectors 1507 and 1517 may be configured to detect the particles and responsively emit signals. In the figure, the upper and lower detectors 1507 and 1517 are shown separated from the system by an arrow, and also shown positioned within the system, so as to show construction details. The system may be configured to compare or subtract detection data from the upper and lower detectors 1507 and 1517, thereby determining whether the source is above, or below, or substantially on the midplane 1530.

The system disclosed herein enables numerous greatly improved radiation detection applications. In some embodiments, the system may be incorporated into a cargo inspection station of the type used for scanning trucks and maritime shipping containers to detect radiation sources. By indicating the longitudinal position of any sources detected, the system can greatly accelerate the inspection process. In a second embodiment, the system may comprise an advanced hand-held radiation detection meter that indicates the direction of the source. In a third embodiment, the system may be configured to detect radioactive contamination on personnel in a walk-through portal. In a fourth embodiment, the system may be incorporated in a mobile threat scanner of the type that measures radiation and detects threat materials while being driven through a region such as city streets.

Figure 16:
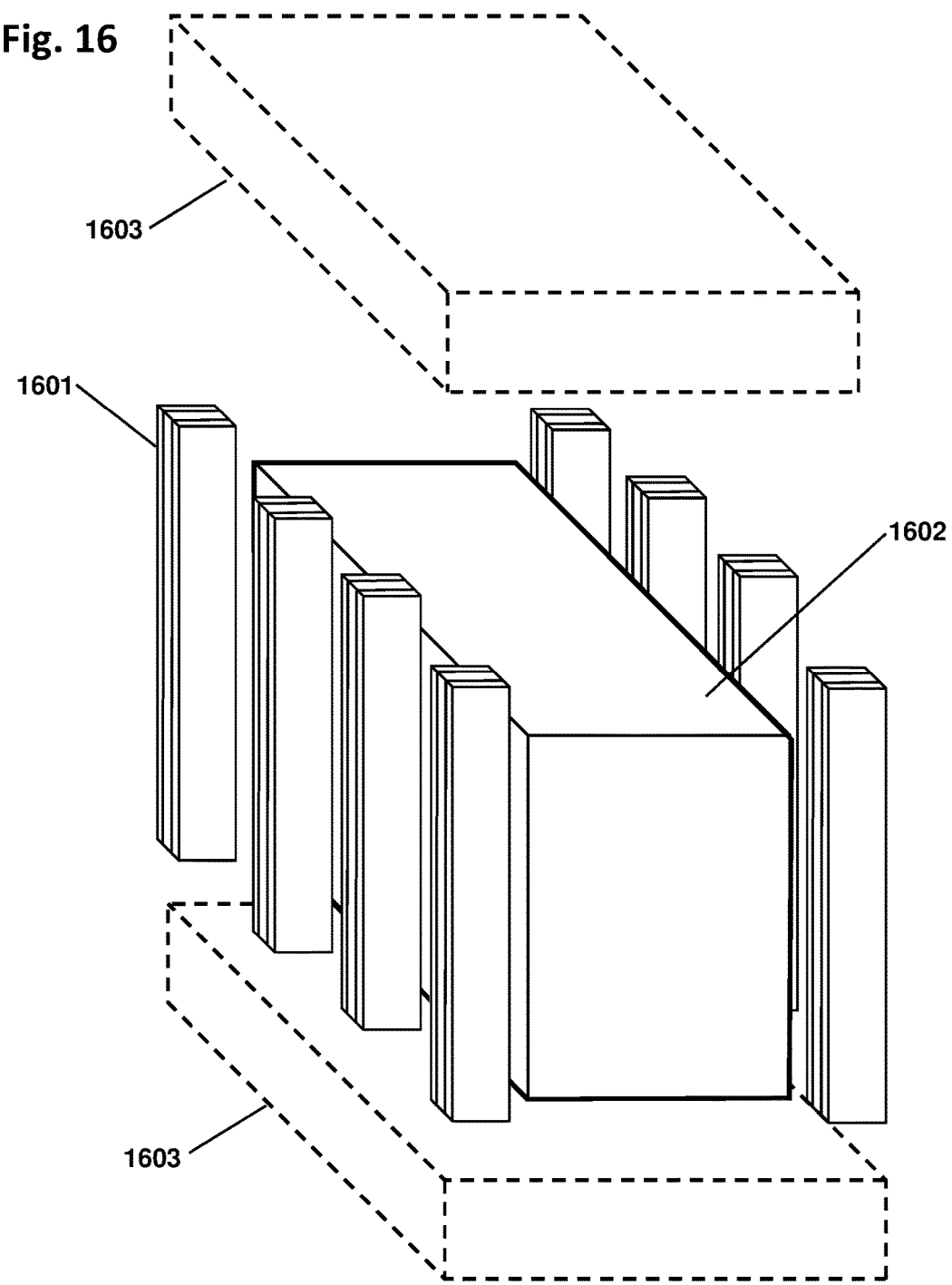
FIG. 16 is a perspective sketch of an exemplary vehicle inspection station incorporating multiple copies of the present system arrayed around an inspection zone according to some embodiments.

FIG. 16 is a perspective sketch of an exemplary vehicle and cargo scanner array comprising a large number of the present systems 1601 arrayed around an inspection object such as a shipping container 1602. The systems 1601 may be arranged on one side of the inspection zone, or both sides as shown, or above and below, or all around the inspection zone for maximum sensitivity. Each of the systems 1601 may be configured to detect gamma rays or neutrons from the container 1602 individually and to determine the horizontal angle of the source relative to each of the systems 1601, according to some embodiments. Alternatively, the detection data from all the systems 1601 may be analyzed together so as to fit the data to a source distribution model or other global analysis for example. Such a global analysis is typically more sensitive and more accurate than simply analyzing the source angle determined by each system 1601 separately. Such a global analysis may be particularly advantageous when the source is shielded.

In a further embodiment, the array may include some systems 1601 mounted vertically, as depicted, to determine the horizontal position of the source, and others oriented horizontally to measure the elevation angle of the source. Then the data from all the detectors in the array may be input to a source model or other fitting routine which can determine the most likely location of the source or sources in three dimensions.

In a further embodiment, some of the systems 1601 may be configured to detect gamma rays, while others may be configured to detect neutrons. Alternatively, each of the systems 1601 may include ionization-density-dependent scintillators that discriminate between neutron and gamma events. In either case, the array can thereby determine (a) whether a gamma ray source is present in the cargo, (b) if so, where the gamma source is, (c) whether a neutron source is present in the cargo, and (d) if so, where the neutron source is. This information can enable much faster scanning and a much more reliable threat localization than non-directional detectors.

In a further embodiment, vehicles being inspected may pass through the inspection zone without stopping, although preferably at a low speed. The exact position of the vehicles may be measured continuously using a position sensing device such as an optical, RF, magnetic or another type of position sensor. The detector data can then be fit to a moving-source model.

In a further embodiment, a cosmic ray scattering-type vehicle inspection system may be provided, comprising two cosmic ray tracking chambers 1603 (shown in dash) positioned above and below the shipping container 1602. The cosmic ray tracking chambers 1603 may be configured to measure the amount of scattering of cosmic ray particles that pass through the shipping container 1602, and thereby reveal nuclear materials or shielding materials that produce anomalously high amounts of scattering. To account for cosmic rays that pass through the systems 1601, each track that intersects one of the systems 1601 may be corrected for extra scattering that may occur in passing through the systems 1601. Alternatively, the track analysis may select only those cosmic rays that do not pass through any of the systems 1601. As a further option, any events may be rejected if any of the systems 1601 is active at the same time as the tracking chambers 1603 detect a cosmic ray. As an even simpler alternative, the systems 1601 may be positioned outside the field of view of the tracking chambers 1603, thereby eliminating any interference.

The combination of a cosmic ray scattering inspection with a directional radiation detection array can provide many advantages. An adversary wishing to reduce the radiation signal may add more shielding around a weapon, but this would increase the amount of cosmic ray scattering and would thereby reveal the threat. Likewise the adversary could reduce the shielding to reduce the scattering signature, but this would greatly increase the amount of radiation detected. Thus the two types of inspections, working in cooperation, leave an adversary no available design space for concealing the threat.

Figure 17A:
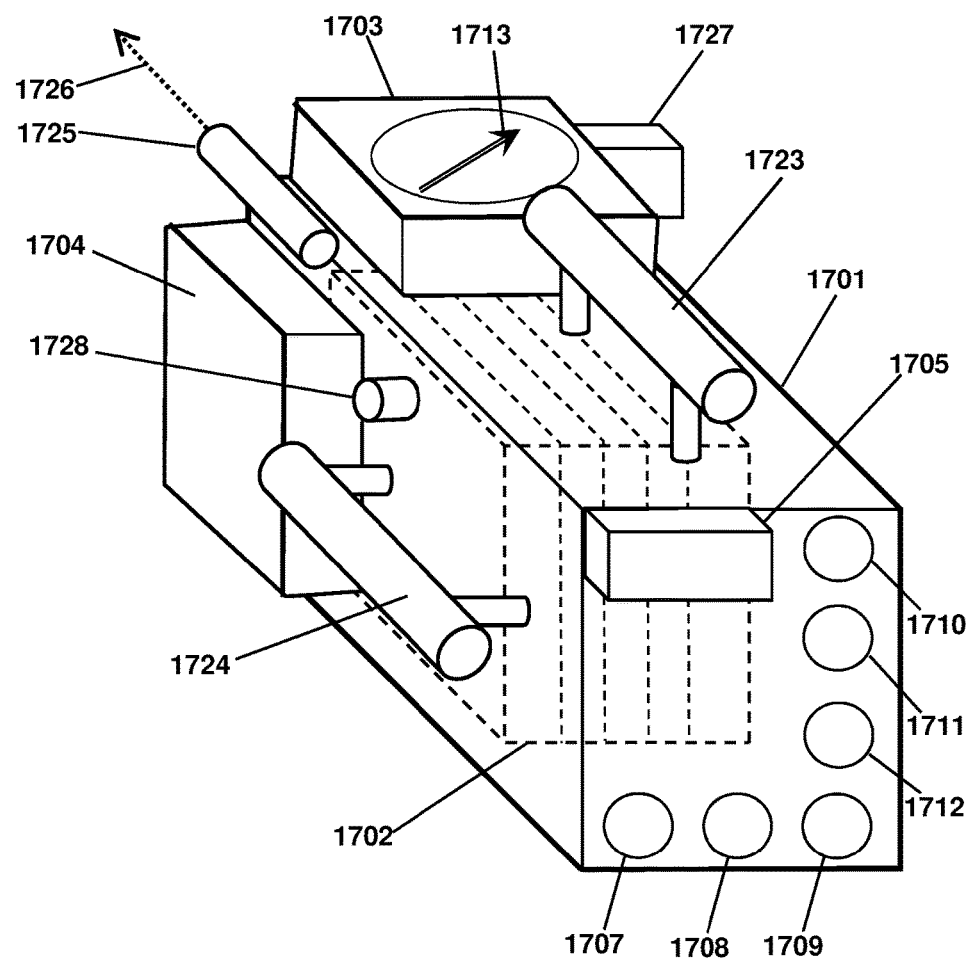
FIG. 17A is a perspective sketch of an exemplary portable directional survey meter according to some embodiments.

FIG. 17A is a perspective sketch of an embodiment of a portable radiation survey meter 1701 that can detect a radioactive source and also indicate the direction of the source. The meter 1701 may include a system 1702 (hidden, shown in dash) and a processor 1705. In some embodiments, the meter 1701 may also include a first display 1703 and a first handle 1723 mounted on a first surface of the meter 1701, and a second display 1704 and a second handle 1724 mounted on a second surface of the meter 1701 which is orthogonal to the first surface. Thus the second handle 1724 and the second display 1704 are orthogonal to the first display and first handle 1703 and 1723. The orthogonal handles 1723 and 1724 thereby allow an operator to conveniently turn the meter 1701 on its side, and the orthogonal displays 1703 and 1704 allow the operator to observe the detection results during a horizontal angle scan or a vertical angle scan.

In some embodiments, the meter 1701 may be configured to display a rotatable icon 1713 pointing toward the calculated source location, preferably presented on whichever display 1703 or 1704 is currently on the uppermost surface of the meter 1701. The depicted meter 1701 is useful for measuring the horizontal angle of a source and indicating its horizontal location to the operator using the first display 1703. When rotated 90 degrees on its side, the depicted meter 1701 is also useful for measuring the vertical angle of a source and indicating its vertical location to the operator using the second display 1704. The meter 1701 may be further configured to blank or disable or otherwise deactivate whichever of the displays 1703 and 1704 is currently not on top. Thus when the meter 1701 is oriented to measure horizontal angles, the first display 1703 may be activated while the second display 1704 may be disabled, and when the meter 1701 is turned on its side and oriented to measure vertical angles, the second display 1704 may be activated and the first display 1703 disabled.

In some embodiments, the meter 1701 may include an electronic compass 1707, and/or a GPS receiver 1708, and/or a multi-axis accelerometer 1709. The compass 1707 can measure the geographical bearing of the meter 1701 which may enable the processor 1705 to determine when the meter 1701 is rotated horizontally, and can thereby relate the source angle to real-world coordinates of the detected source. The GPS receiver 1708 can determine the spatial position of the meter 1701, which can then be recorded internally or transmitted to an external receiver. Using the GPS data, the position of the source can be determined by triangulation from two measurement locations. The accelerometer 1709 can detect when the meter 1701 is turned on its side, thereby enabling the processor 1705 to allocate measurements to horizontal or vertical source angles accordingly. The accelerometer 1709 may also detect when the meter 1701 is moved or rotated quickly, thereby enabling the displayed icon 1713 to be erased until new data is accumulated. For example, when the meter 1701 is rotated or moved quickly, the processor 1705 may blank the displays 1703 and 1704 to avoid misleading the operator, or the displays 1703 and 1704 can be changed to show a busy-icon for example. Alternatively, the processor 1705 may be configured to correct the display 1703 or 1704 according to the rotation, for example by subtracting the rotation angle from the angle of the directional icon 1713, so that the icon 1713 continues to point toward the source after the rotation. In either case, as soon as sufficient additional detection data are acquired to enable an updated source angle determination, the displays 1703 and 1704 can be updated to again show an icon 1713 pointing toward the source.

In some embodiments, the meter 1701 may also include a microphone 1710, and/or a speaker 1711, and/or a hold button 1712. The microphone 1710 can enable the operator to record comments made during the scan in real-time. The speaker 1711 can provide acoustical alarm data to warn the operator of a high radiation environment, and/or other alarms. The speaker 1711 can also provide special sounds indicating that the source is to the right or left of the aiming plane, and yet another sound when the aiming plane is directly aligned with the source, thereby assisting the operator in localizing the source without looking away from the scene. The hold button 1712 may allow the operator to freeze the displays 1703 and 1704 with the accumulated radiation and directional information displayed, so that the operator can then read them at a later time. The hold button 1712 may be a press-to-run button, a press-to-hold button, a run-hold toggle switch, or any other manually-operable control component. In a further embodiment, the holding and running modes may be controlled by spoken commands, such as the operator saying "hold" or "stop" to freeze the display, and "go" or "run" to resume updating the display by speaking one of the commands, which can be reliably discerned with low-cost microcontrollers in some embodiments.

The portable meter 1701 may be operated by a human operator, or by a robot operator with grasping means to manipulate the meter 1701. The robot may include viewing means to read the display 1703, or a wireless link to receive detection and angular data.

In some embodiments, the processor 1705 may continuously calculate the source angle relative to the current aiming plane, and then may update the display 1703 or 1704 to show the calculated source angle (preferably including both sign and magnitude of the source angle) in real-time. The processor 1705 may be configured to update the source angle incrementally, with the oldest data being discarded or attenuated relative to the most recent acquisitions. Emphasis on the newest data may be accomplished using a ring buffer, or by weighting the most recent data above the older data, or by incremental averaging, or other means to reflect the latest angular results while discarding or attenuating the older results. Continuous updating of the calculated source location may help the operator to rapidly locate the source.

The display 1703 or 1704 may be configured to show a directional display icon 1713 indicating the source direction. In a first embodiment of the display icon 1713, the meter 1701 may be configured to display a left or right arrow indicating the left or right directionality of the source, wherein the length or other feature of the arrow may be configured to indicate the magnitude of the source angle. The operator may then rotate the meter 1701 left or right in the direction indicated by the display icon 1713, preferably rotating more rapidly or by a larger amount if the indicated source angle is large or rotating more slowly and by a smaller amount if the indicated source angle is small. By these steps, the operator can rapidly converge on the source direction.

In a second embodiment, the icon 1713 may be rotatable and configured to point directly toward the source location according to the currently determined source angle. After viewing the rotatable display icon 1713, the operator may simply turn the meter 1701 according to the display icon 1713, thereby bringing the system directly into alignment with the source in one step, without having to gradually or iteratively converge on it. The processor may then detect the actual amount of rotation of the meter 1701, according to signals from the compass 1707 for example, and may then adjust the display icon 1713 accordingly. For example, the processor 1705 may subtract the rotation angle from the current angle of the display icon 1713. In that way the displayed icon 1713 continues to point toward the source even as the meter 1701 is rotated. In a preferable embodiment, the processor 1705 may then acquire additional detection data at the (rotated) second orientation, and may recalculate the source angle based on the new data, and recalculate the source angle, and adjust the direction of the displayed icon 1713 according to the updated calculation.

In some embodiments, the meter 1701 may be configured to determine when the aiming plane becomes aligned with the source. For example, the meter 1701 may use the "calculated angle" criterion to determine the alignment, wherein the aiming plane is aligned with the source when the calculated source angle is less than some threshold such as 1 degree or 2 degrees. Alternatively, the meter 1701 may use the "equal-rates" criterion, wherein the side detector rates are equal within expected statistical errors when the aiming plane and the source are aligned. As a further option, the meter 1701 may use a combination of the two criteria. Additionally, when the meter 1701 is aligned with the source, the display 1703 or 1704 may indicate that the aiming plane is aligned with the source using, for example, a special icon, thereby enabling the operator to localize the source more easily and more rapidly than possible with directional meters that fail to determine the magnitude of the source angle.

Embodiments of the meter 1701 may include a light beam transmitter 1725 emitting a light beam 1726. In some embodiments, the light beam 1726 may be directed along the aiming plane, thereby showing exactly where the meter 1701 is aimed. In addition, the light beam 1726 may be configured to indicate the left or right direction toward the source, for example with an asymmetric beam shape such as a wedge pointing left or right. The beam shape may be further configured to indicate the magnitude of the source angle as well as the left-right direction, for example being elongated when the magnitude of the source angle is large or foreshortened when the source angle is small. In addition, the beam shape may be reduced to a circular spot, or caused to flicker, or otherwise visibly modulated, when the source angle is very small or zero, thereby indicating the exact source location visually when the meter 1701 is aligned with the source. Such a variable light beam shape, indicating the direction of the source as well as the magnitude of the source angle, greatly assists the operator in locating a source quickly.

In another embodiment, the meter 1701 may be configured to redirect the light beam 1726 directly toward the calculated source location as soon as its location is determined. In some embodiments, the meter 1701 may be configured to rotate the light beam transmitter 1725 itself according to the calculated source angle. Alternatively, the meter 1701 may be configured to redirect the light beam 1726, using a rotatable mirror for example. In both cases, the redirected light beam 1726 may bathe the source location in light and thereby provide an unambiguous visual indication of the source location. The light beam 1726 may be flickered or modulated in shape or otherwise modulated to enhance visibility. As a particular advantage, the light beam 1726 may appear to remain "locked on" to the calculated source location while the meter 1701 is moved around and rotated. For example, the processor 1705 may be configured to detect any rotation of the meter 1701, using signals from the compass 1707 or otherwise, and thereby adjust the light beam 1726 direction accordingly. In addition the processor 1705 may be configured to recalculate the source angle repeatedly and to adjust the light beam 1726 angle in near-real-time. By these means, the light beam 1726 may remain continuously and persistently directed toward the source location, thereby revealing the source to the operator in a compelling and intuitive visual manner.

Embodiments of the meter 1701 may include a camera 1727 or other imaging device to record images of the scene. The camera 1727 may be aligned with the aiming plane, in which case an icon or other indicator may be added to the image at the calculated source location. In addition to recording the scene and the source location, the camera 1727 may also be useful for determining a rotation angle of the meter 1701. For example, as the meter 1701 is rotated to different orientations, the image shifts accordingly, and the processor 1705 can then perform image analysis by comparing sequential images, and thereby determine how far the meter 1701 has been rotated. The processor 1705 can then use that rotation angle, along with the detector counting rates acquired both before and after the rotation, to localize the source using, for example, interpolation.

In an alternative embodiment, the system 1701 may be configured to redirect the image so that it is centered on the source location. For example, the system 1701 may be configured to rotate the camera 1727 according to the calculated source angle, or the system 1701 may use a rotating mirror, or other optical means, to cause the image to be centered on the calculated source location. In addition, the camera 1727 may be configured to vary a zoom lens or equivalent, and thereby acquire both wide-angle and magnified images centered on the source location. For example, the source-centered scene may be magnified successively in various images, such as acquiring a new image whenever the angular uncertainty in the source angle is improved with further data. In addition, the angular uncertainty may be indicated on each image by a numerical or graphical overlay for example. The camera 1727 may be activated upon the start or end of each period of detector data acquisition, or manually by an operator, or continuously, or periodically, or upon a computer command, or whenever the meter 1701 is rotated, or otherwise.

In some embodiments, the meter 1701 may be configured to accumulate detector data for a particular time interval termed the "integration time," and then may analyze the accumulated data to determine the source angle. For example, the integration time may be set to a default value such as one second or ten seconds, or it may be adjustable manually by the operator using an integration time control 1728 such as a knob, or the integration time may be adjusted automatically by the processor 1705. A short integration time may be sufficient to localize the source quickly if the radiation level is high, but if the source is small or well-shielded, the rates are likely to be much lower or barely above background, in which case a longer integration time may be preferable. As a further option, the integration time may be adjusted dynamically in real-time according to the detection rate obtained, or according to the angular uncertainty so far obtained, or other criteria. The processor 1705 may be configured to perform a method comprising first checking the overall radiation level, for example by checking the accumulated counts in the middle detector and/or by adding the counting rates of the two side detectors. The processor 1705 may be configured to then adjust the integration time so as to obtain sufficient counts for a satisfactory determination of the source angle.

In another embodiment, the processor 1705 may be configured to follow a sequential acquisition program comprising first acquiring detector data for a short integration time, then obtaining an early indication of the presence of a source based on the sum of the side detector rates being above background levels, then continuing to acquire data for a second integration time to obtain sufficient data to determine the sign of the source angle based on the difference between the two side detector counting rates, then continuing to acquire data for a third integration time to obtain sufficient data to determine the magnitude of the source angle based on a comparison of the middle detector and side detector rates, and then acquiring data for a fourth integration time to obtain sufficient data to reduce the uncertainty in the source angle to a predetermined level.

In some embodiments, the processor 1705 may be configured to analyze the detector data and calculate a best-fit source angle continuously while further data is being accumulated. The processor 1705 may be configured to update the source angle determination after every detection, or at preset intervals such as once per second, using whatever data has been accumulated so far. In one embodiment, the processor 1705 may be configured to determine when the meter 1701 has been rotated, and to then delete the accumulated detector data, and to then start over with new data, thereby avoiding showing an outdated result to the operator. In a second embodiment, the processor 1705 may be configured to determine how far the meter 1701 has been rotated, and then subtract that rotation from the current estimate of the source angle before continuing to accumulate further detection data, thereby continuing to provide the best estimate of the source angle to the operator throughout the rotation.

Figure 17B:
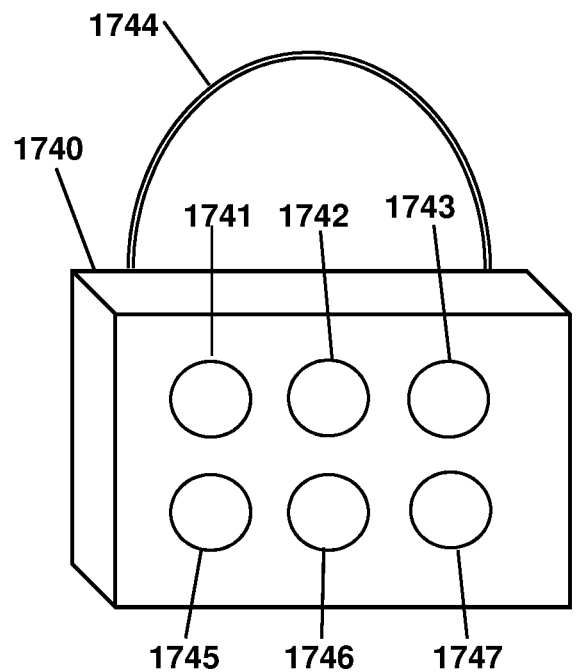
FIG. 17B is a perspective sketch of an exemplary wearable health and safety monitor according to some embodiments.

FIG. 17B is an exemplary sketch in perspective of a wearable health and safety monitor 1740 which may be worn by the operator of the portable meter 1701 of FIG. 17A. The monitor 1740 may be wirelessly linked to the meter 1701, using Bluetooth or Wi-Fi or other communication technology for example. Embodiments of the monitor 1740 can be worn by the operator using an attachment 1744 such as a belt clip, harness, neck strap, or the like. The monitor 1740 can continuously monitor the health and safety status of the operator, and can communicate any detected problems automatically to the meter 1701, which can pass the alarm to a central facility and/or peer nodes in the LAN. Alternatively, the monitor 1740 may transmit the alarm directly to an external receiver such as an emergency response facility. The monitor 1740 may include a 3-axis accelerometer 1741 or other means to determine whether the operator remains upright or has fallen, a microphone 1742 configured to receive verbal data from the operator, and a wireless transceiver 1743 configured to communicate with the processor 1705 or other receiver. The monitor 1740 may further include biometric devices such as a respiration sensor 1745, a pulse timer 1746, and a blood pressure sensor 1747 as well as other health and safety related diagnostics. Thus, the meter 1701, with its linked health and safety monitor 1740, can enable a near-instantaneous rescue response when the operator experiences an emergency situation in the field.

Figure 17C:
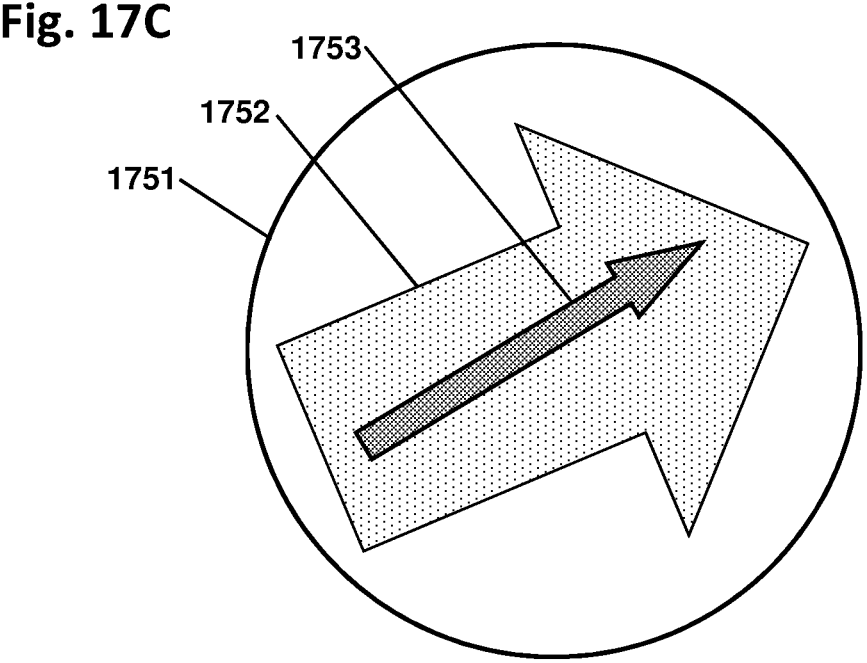
FIG. 17C is a perspective sketch of an exemplary display showing two analysis results according to some embodiments.

FIG. 17C shows an exemplary display 1751 that provides information about the source angle as well as the uncertainty in the source angle. In some embodiments, the processor 1705 of FIG. 17A may be configured to execute two parallel analyses with two different integration times. For example, the processor 1705 may be configured to carry out a first analysis using a short integration time, which thereby provides a rapidly updated value of the source angle, albeit with large uncertainties due to the limited number of detections observable in that short integration time. The processor 1705 may be further configured to carry out a second analysis concurrently, using a much longer integration time, which thereby provides a more reliable measure of the source angle, but more slowly. Both the fast and slow results may be displayed and updated continuously, or periodically, so that the operator can assess the results visually in real time. For example, the fast results with lower resolution may be displayed using a broad directional icon 1752, thereby suggesting a general source direction with a relatively wide range of angles, overlain by a sharper and more stable directional icon 1753 showing the slower, high-resolution angle result. With such a composite display, the operator can evaluate the source location in real-time while moving through a clutter field and other variations, by attending either the fast low-resolution icon 1752 or the slow high-resolution icon 1753 according to the current inspection conditions.

Figure 18:
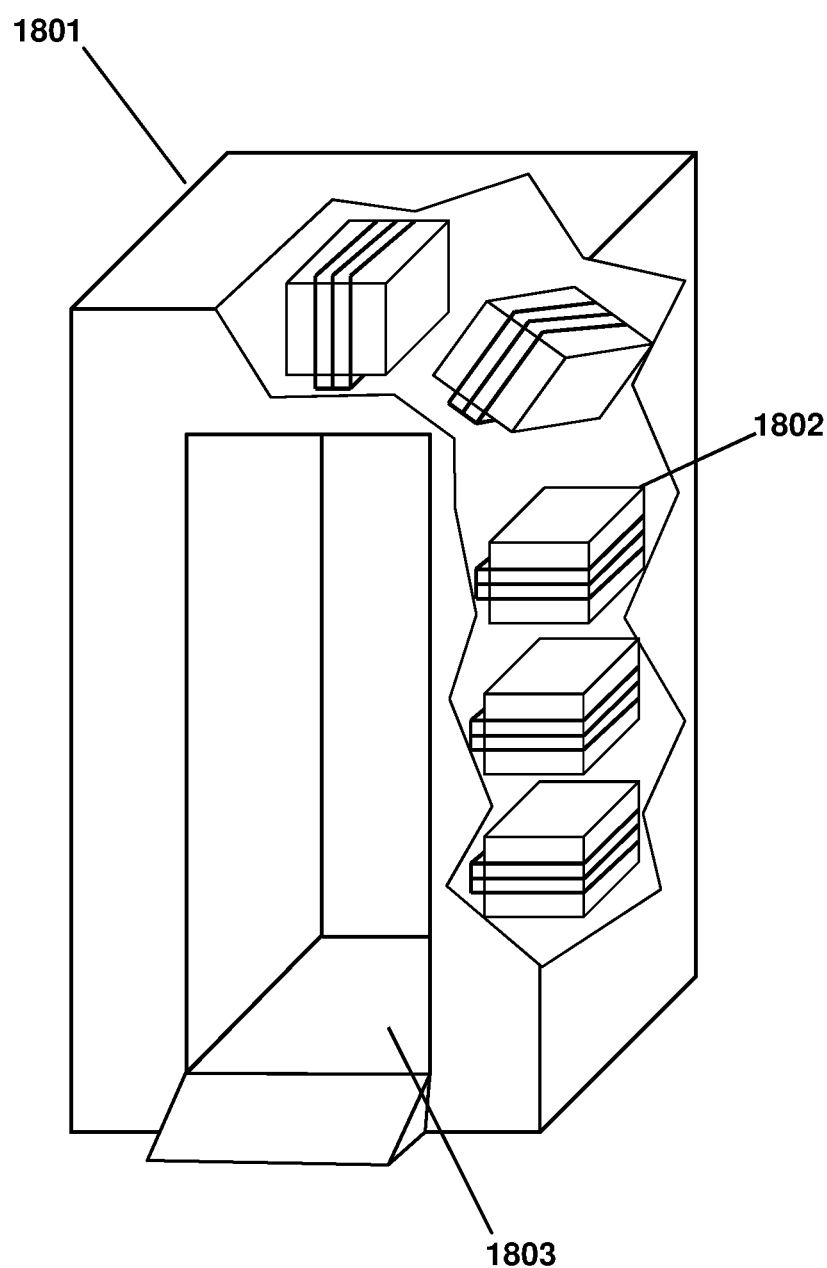
FIG. 18 is a sketch in perspective, partly cut-away, of an exemplary walk-through portal with multiple copies of the system arranged in the walls of the portal according to some embodiments.

FIG. 18 shows in perspective, partially cut-away, an embodiment of a walk-through portal 1801 in which a plurality of the present systems 1802 are mounted. In this application, it may be advantageous to mount the systems 1802 with their aiming planes horizontal so that each system 1802 can measure the vertical location of the source on a person. Systems 1802 may be mounted in the walls and ceiling of the portal 1801. In another embodiment, further systems 1802 may be mounted under the floor 1803 of the portal 1801 as well. Alternatively, the floor 1803 may comprise an automatic weighing scale configured to determine when a person is in the portal 1801, and to sound an alarm if the person tries to pass through the portal 1801 too quickly. By localizing the source, the portal 1801 can indicate where the source is concealed on a worker's clothes, toolbox, hair, shoes, etc.

Figure 19:
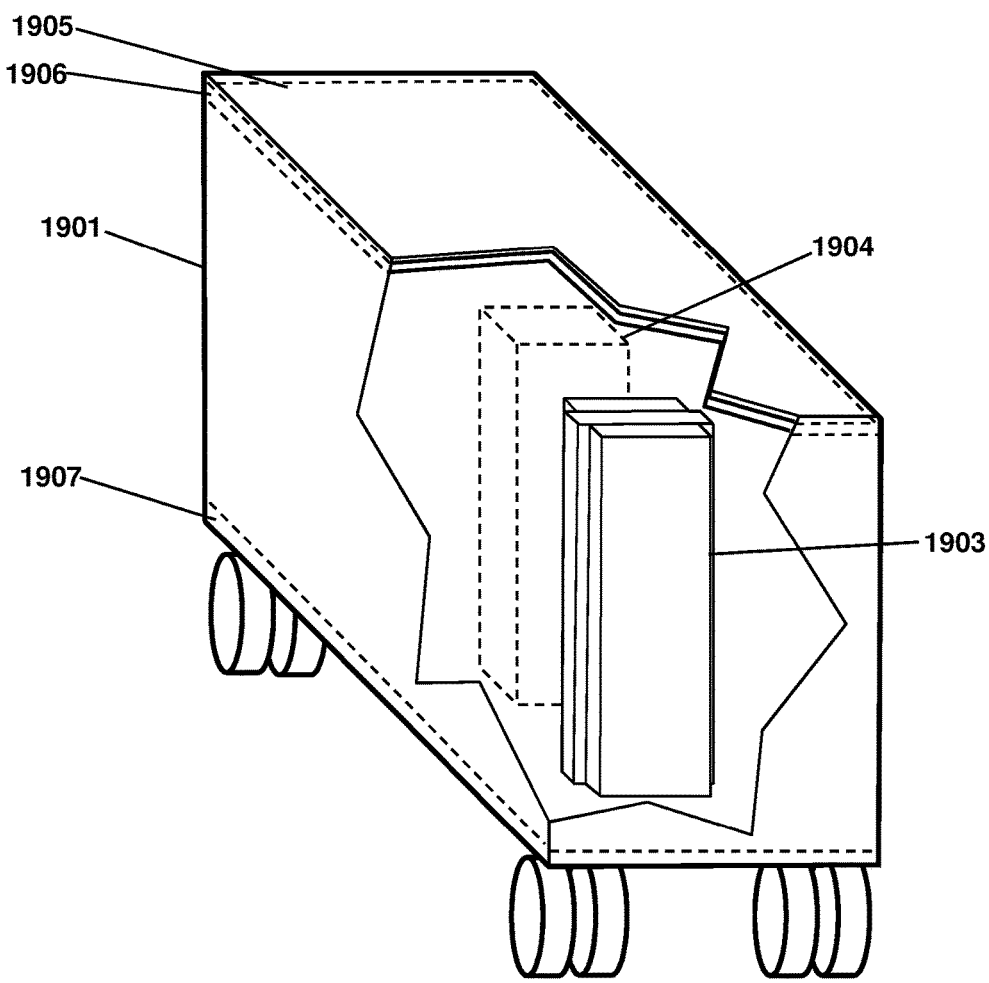
FIG. 19 is a sketch in perspective, partly cut-away, of an exemplary mobile radiation scanner containing multiple copies of the system according to some embodiments.

FIG. 19 shows in perspective an embodiment of a mobile radiation scanner 1901 comprising a truck or van configured to detect hidden sources in, for example, an urban environment. The mobile scanner 1901, partially cut-away, may include an array of the present systems 1903, of which some are shown in dash and others are behind the shell of the mobile scanner 1901. Preferably the array of systems 1903 nearly fills the central region of the mobile scanner 1901 so as to maximize the detection area when viewed from the side. The systems 1903 may be of the bidirectional type as depicted in FIG. 15 to detect particles arriving from either the left or right side of the mobile scanner 1901. Alternatively, the systems 1903 may be of the unidirectional type as depicted in FIG. 1 to detect particles arriving from one side, such as the curb side, of the mobile scanner 1901.

Some embodiments also include a cosmic ray veto counter 1905, comprising a plastic scintillator for example, configured to reject events that include a cosmic ray signal. An optional neutron shield 1906 may also be added to the ceiling to block naturally occurring low-energy neutrons, and a second neutron shield 1907 may be mounted on the floor to block ground-effect neutrons. The neutron shields 1906 and 1907 may each comprise a layer of LiF in HDPE, for example.

By recording the detection rates in each of the systems 1903 and 1904 as well as the GPS coordinates and bearing, the mobile scanner 1901 can prepare a two-dimensional map of radiation sources in the environment. High sensitivity and high specificity can be achieved in the radiation map due to the directionality of each system 1903 and 1904. Any future changes to the radiation distribution would then be a cause for alarm.

In some embodiments, some of the systems 1903 or 1904 may comprise neutron-sensitive gamma-blind detector material, while others may comprise gamma-sensitive neutron-blind material, thereby simultaneously providing a map of the neutron radiation distribution and a separate map of gamma sources. Likewise the systems 1903 and 1904 may be configured to detect high energy neutrons and to reject low energy neutrons, or vice-versa. Most naturally-occurring background neutrons have low energy due to multiple scattering in the atmosphere, whereas neutrons from weapon materials are generally high energy of 1 MeV to a few MeV depending on composition. In some embodiments, detecting even a few high energy neutrons would be suspicious, particularly if they all come from a particular location.

Figure 20:
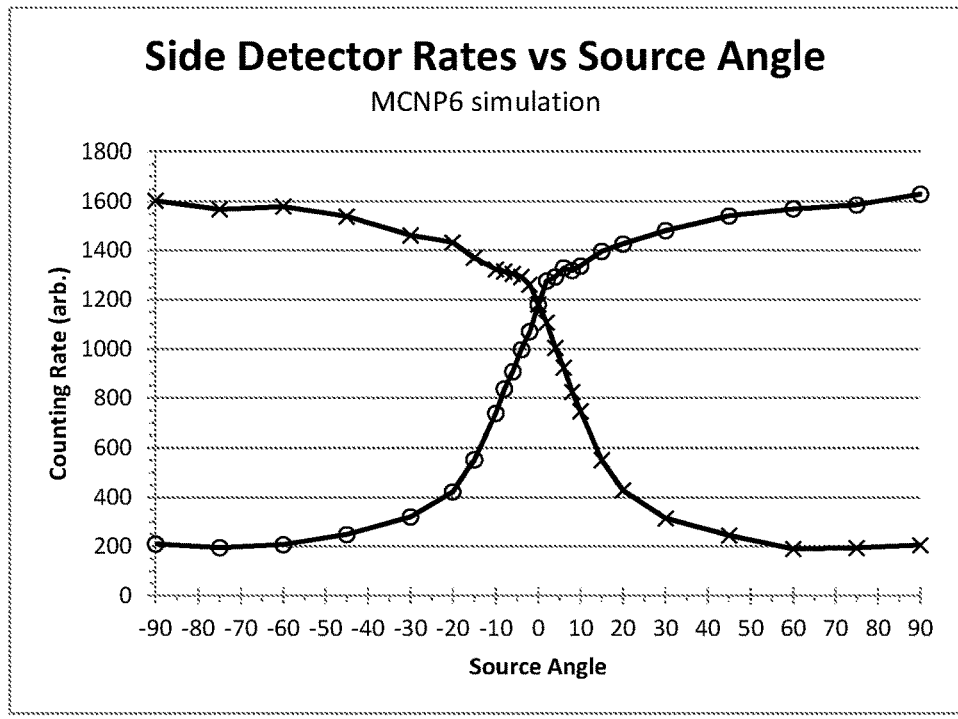
FIG. 20 is a graph showing the results of an MCNP6 simulation, showing the counting rates of the two side detectors versus the source angle.

FIG. 20 is a graph showing the results of an MCNP6 simulation, in which gamma rays from a source were detected in a simulated system configured according to the present disclosure. The graph shows the detection rates in the side detectors, versus the source angle, using a simulated configuration such as that of FIG. 2. The data were obtained assuming PVT side detectors with a thickness of 25 mm, and Pb shields with a thickness of 15 mm. The source was a 1.0 MeV isotropic gamma source. The aiming plane was held constant at zero degrees in the simulation, while the source was moved around the system from −90 to +90 degrees relative to the aiming plane. The curve shown with O's is the counting rate in arbitrary units, for one of the side detectors. It exhibits a high counting rate when the source is at +90 degrees, and drops to a low counting rate when the source moves around to −90 degrees relative to the aiming plane. This is expected since the shields block the gammas from reaching that side detector when the source is on the opposite side. The other side detector, marked with X's, shows a high rate when the source is at −90 degrees, and a low rate at +90 degrees due to the shielding.

Figure 21:
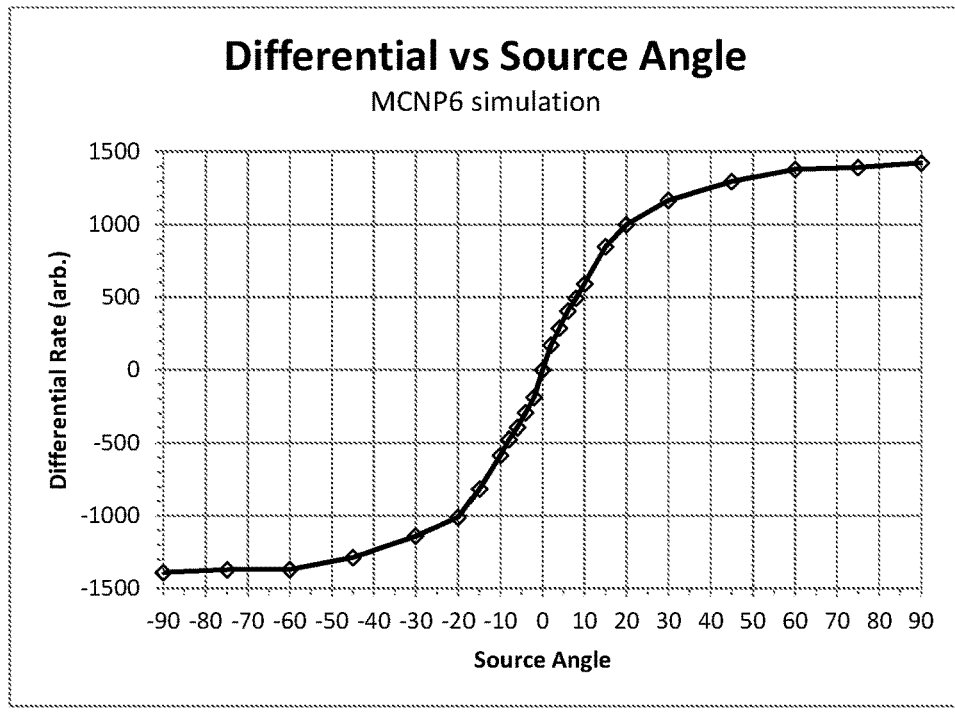
FIG. 21 is a graph from the same simulation as FIG. 20, showing the calculated differential versus source angle.

FIG. 21 is a graph showing the calculated differential between the two side detector counting rates for the simulation of FIG. 20. The differential equals the counting rate of the first side detector, marked with O's, minus the second side detector rate, marked with X's. The differential curve is a smooth antisymmetric distribution centered on the aiming plane at zero degrees.

Figure 22:
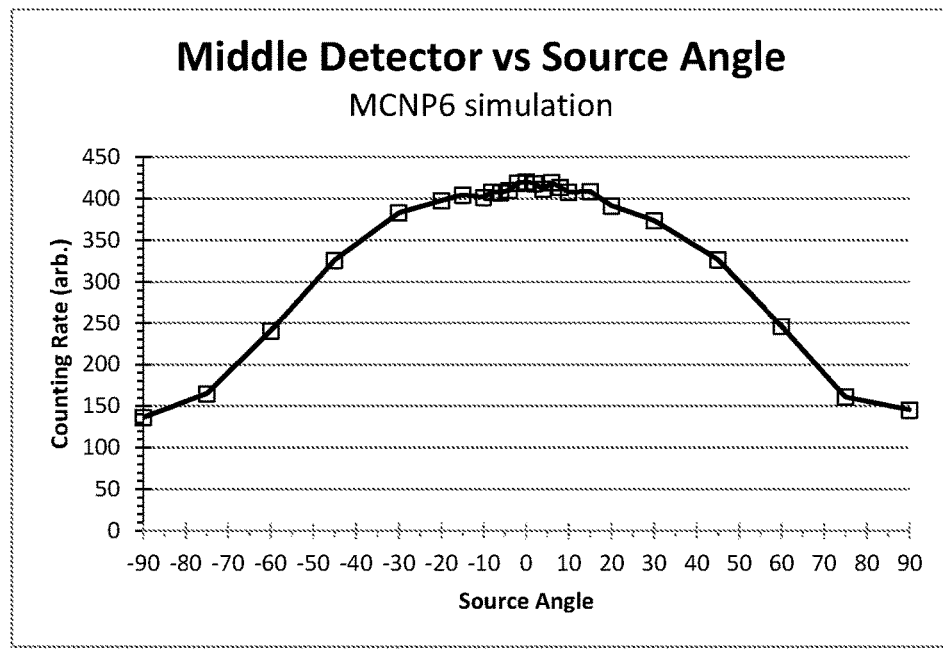
FIG. 22 is a graph from the same simulation as FIG. 20, showing the counting rate of the middle detector versus the source angle.

FIG. 22 is a graph from the same simulation as FIG. 20, showing the counting rate for the middle detector versus source angle. The simulated middle detector was $CdWO_4$, 3 mm thick and 30 mm wide, mounted with a 15 mm recess from the front ends of the shields. As expected, the middle detector had a high detection rate when the system was aimed at the source.

Figure 23:
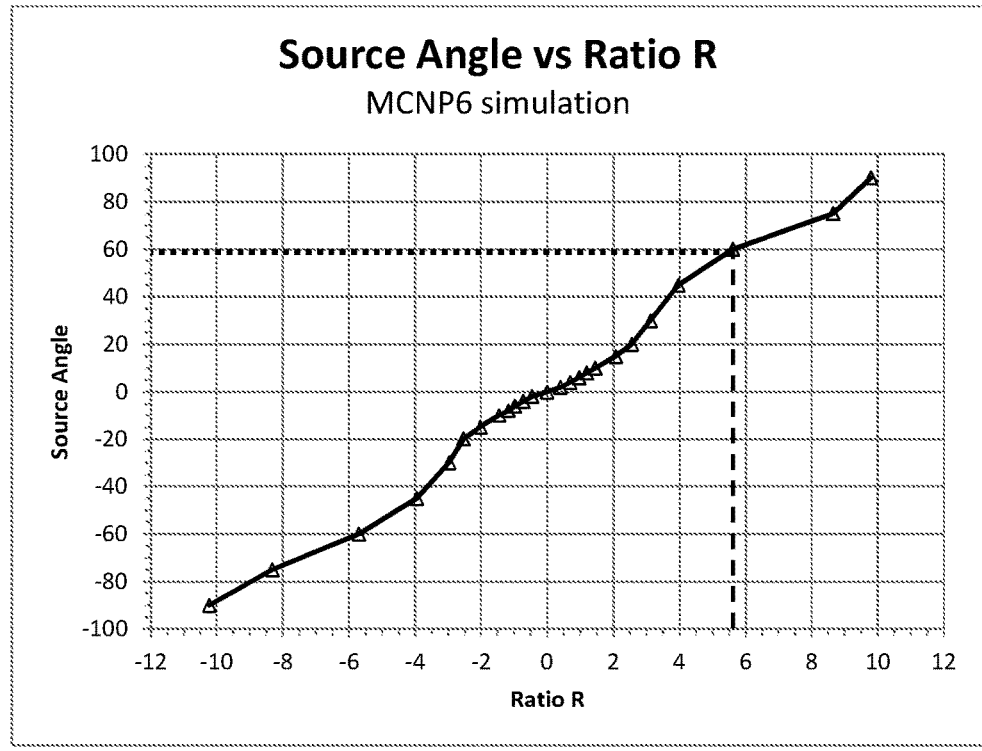
FIG. 23 is a graph based on the simulation of FIG. 20, showing the angular correlation function that relates the source angle to the counting rate ratio.

FIG. 23 is a graph showing the angular correlation function, derived from the detection data versus source angle in the simulation. The curve of FIG. 23 is the angular correlation function relating the source angle to the ratio R=D/S3 where D is the differential between the two side detector counting rates as shown in FIG. 21, and S3 is the middle detector counting rate of FIG. 22. The angular sensitivities of the side detectors and the middle detector are sufficiently different that the function graphed can determine the source angle, both sign and magnitude, from a single set of detector rates.

In operation, according to some embodiments, the counting rates may first be acquired, then the differential may be found by subtracting the counting rate of the first side detector from the second side detector. Then the differential may be divided by the middle detector rate, thereby obtaining the ratio R. Then, reading across the horizontal axis of FIG. 23 to the calculated value of R, the curve value at that point may indicate the corresponding source angle on the vertical axis. The correlation is monotonic, meaning that a unique source angle can be found from R. For example, using the angular correlation function of FIG. 23, the simulated detection data with a ratio of R=5.6 (dashed line) corresponds to a source angle of about 59 degrees (dotted horizontal line), in close agreement with the actual value of 60 degrees.

Figure 24:
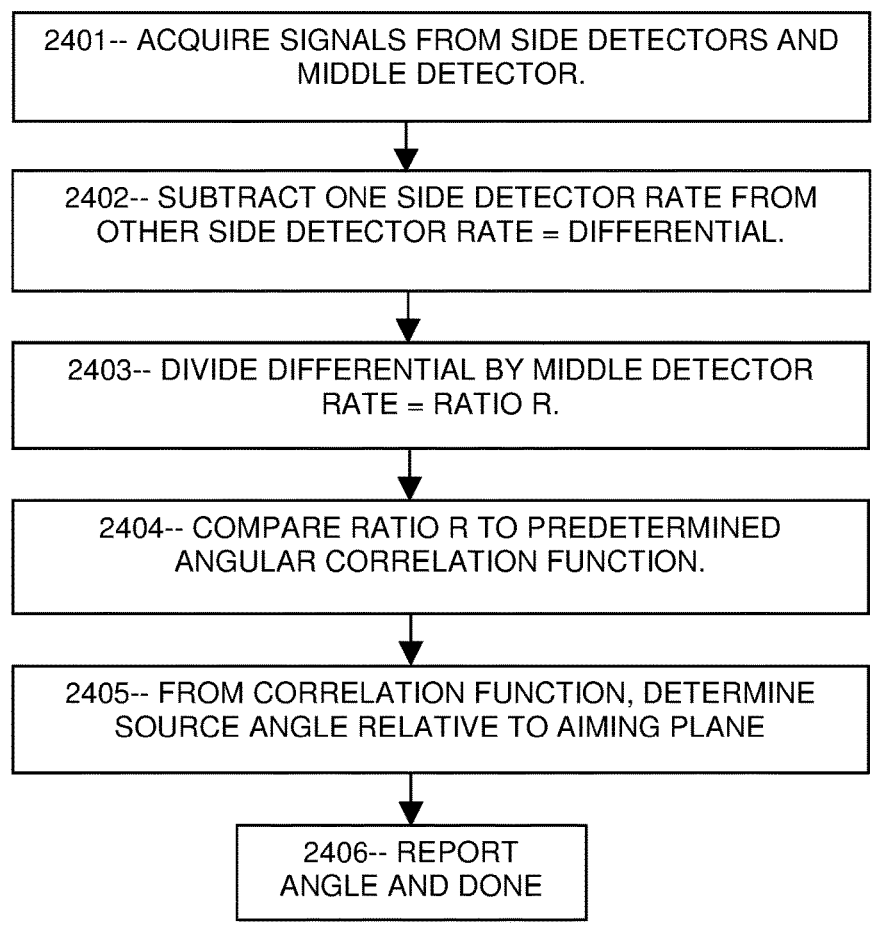
FIG. 24 is a flowchart showing steps of an exemplary method for calculating the source angle according to some embodiments.

FIG. 24 is a flowchart showing the steps of an exemplary method for determining the source angle according to some embodiments. First 2401 the side detector counting rates and the middle detector counting rates may be measured. Then, 2402 the detection rates for one side detector may be subtracted from the other side detector, thereby obtaining a differential. Then, the ratio R may be calculated 2403 by dividing the differential by the middle detector rate. R may then be compared 2404 to the predetermined angular correlation function, and the source angle may be determined 2405 as the particular angle that matches the angular correlation function at the calculated value of R. Then, 2406 the calculated angle, both sign and magnitude, may be displayed or transmitted or otherwise reported.

More specifically, the system may include non-transient computer-readable media containing instructions that, when executed by a computer or processor, carry out a method to determine the source angle from detection data. The method may include measuring detection rates S1 and S2 of the side detectors and S3 if the middle detector, calculating a differential D equal to the difference between the side detector counting rates or D=S1−S2, and dividing the differential by the middle detector counting rate to obtain a ratio R=D/S3. Alternatively and equivalently, the side detector rates may be divided by the middle detector rate first and then subtracted, as in R=(S1/S3)−(S2/S3). The method may then include comparing R (or its inverse) to the predetermined angular correlation function. Or, equivalently, the value of R may be provided as input to the predetermined angular correlation function. Since the correlation function is configured to relate the source angle to the particle detection rates (or to the ratio R), the angular correlation function thereby provides the value of the source angle as output. The method may include determining both the sign and magnitude of the source angle from the comparing of R to the angular correlation function, thereby directly obtaining the angle between the source direction and the aiming plane. Positive and negative values of the differential may correspond to positive and negative values of the source angle respectively, while large and small magnitudes of the ratio may correspond to large and small magnitudes of the source angle. Preferably, the counting rates of each detector may be corrected for the detection efficiency and normal background rate of each detector before the differential is calculated. In one embodiment, the analysis may use a different measure of the detector activity, other than the counting rates, such as the integrated signal current or the accumulated charge from each detector, or other measure associated with particle detection in each detector, so long as the resulting ratio is related to the source angle by a specific, and preferably monotonic, relationship.

Figure 25:
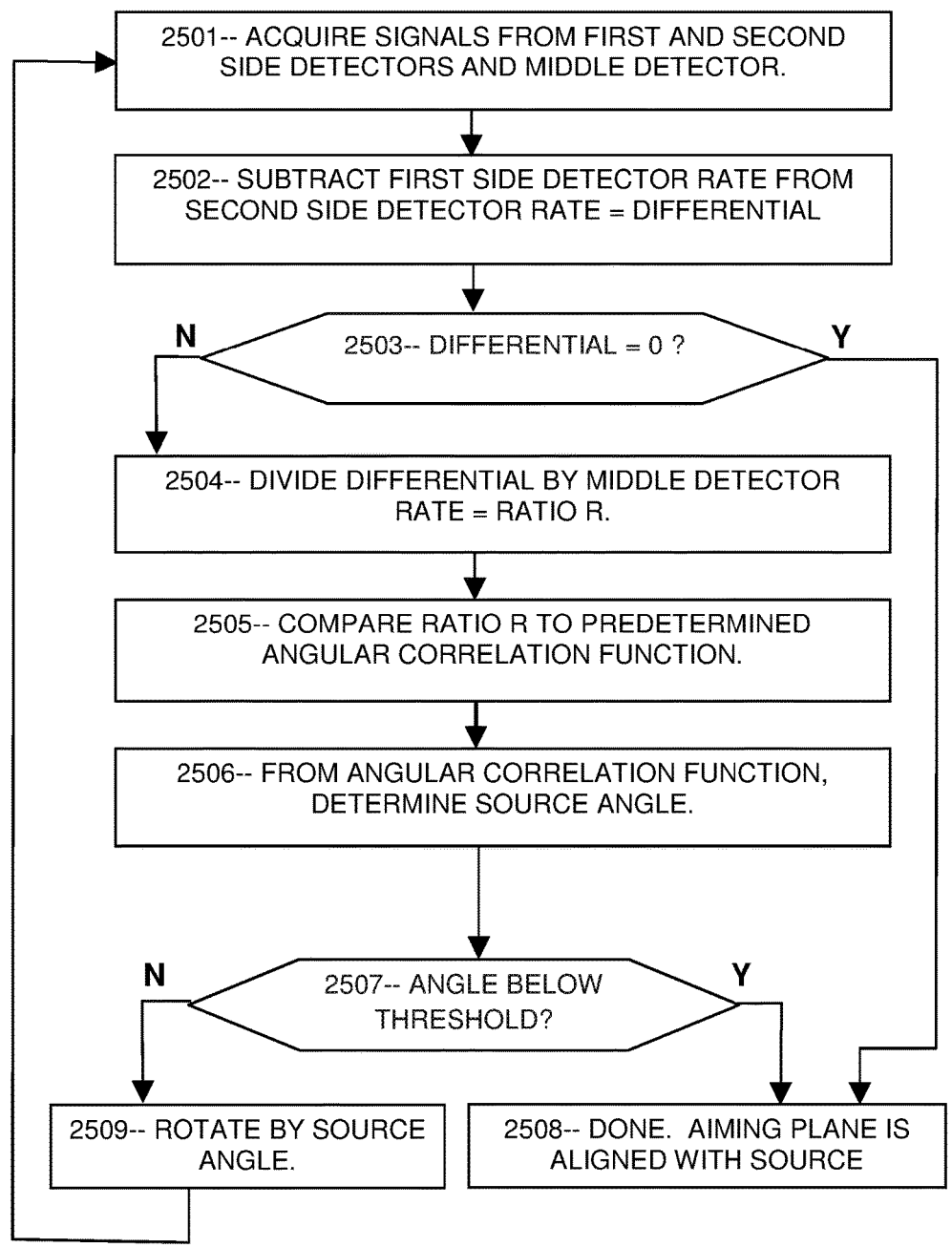
FIG. 25 is a flowchart showing steps of an exemplary method to rotate the system into alignment with the source according to some embodiments.

FIG. 25 is a flowchart showing the steps of an exemplary method for aligning the system with the source. Many applications require that the system be rotated into alignment with the source to localize the source more precisely, or to acquire spectral data on the source using an energy-resolving fourth detector positioned between the shields for example, or for other reasons. To align the aiming plane with the source location, the side detector counting rates and the middle detector counting rates may first be measured 2501. Then, 2502 the detection rates for one side detector may be subtracted from the other side detector, thereby obtaining a differential. Then, 2503 the differential may be tested for being at zero or within some limit of zero. If so, then the task is done 2508, since the aiming plane is aligned with the source. If the aiming plane is not yet aligned with the source, the ratio R may be calculated 2504 by dividing the differential by the middle detector rate. R may then be compared 2505 to the predetermined angular correlation function, and the source angle may be determined 2506 as the particular angle that matches the angular correlation function at the calculated value of R. Then, 2507 if the magnitude of the calculated angle is below a threshold value, the aiming plane is sufficiently aligned with the source 2508 and the task is done. If the calculated angle is not below the threshold value, then 2509 the system may be rotated according to the calculated angle, including both sign and magnitude of the calculated angle, thereby bringing the aiming plane closer into alignment with the source. The method then returns to the beginning 2501 to acquire detection data at the new orientation.

In some embodiments, the system can arrive at or close to the source location in a single rotation according to the calculated source angle. Preferred embodiments can then verify the alignment by comparing the side detector counting rates, which are substantially identical (within statistical uncertainties) when the source is aligned with the aiming plane. By determining the magnitude of the source angle as well as its sign, embodiments of the system can avoid the time-consuming, error-prone, skill-intensive, iterative hunt-and-peck process employed by conventional detectors to locate a source.

Figure 26:
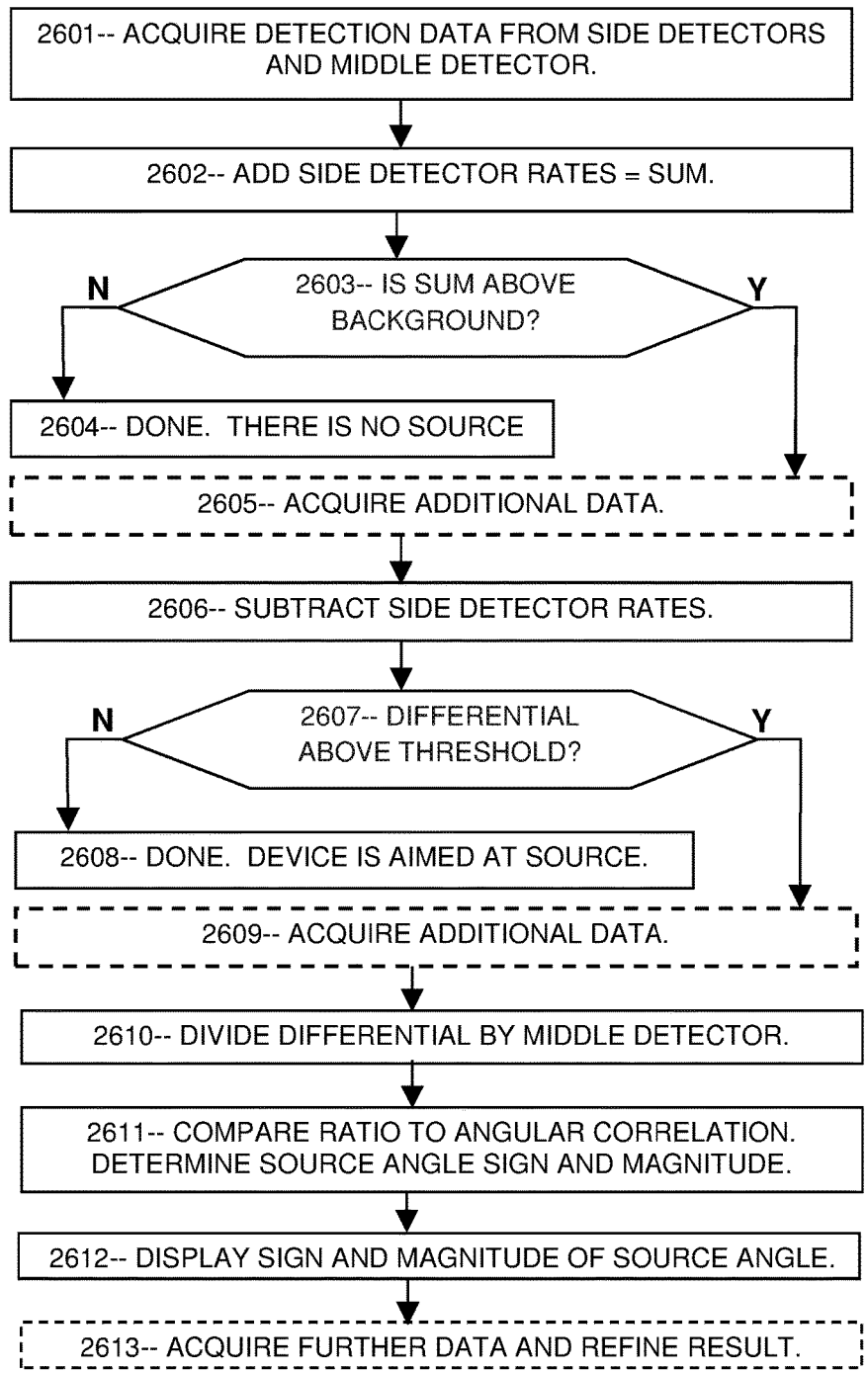
FIG. 26 is a flowchart showing steps of an exemplary staged analysis method to optimize the use of low detection rates according to some embodiments.

FIG. 26 is a flowchart showing an exemplary method for determining the source angle in incremental stages according to some embodiments. In this method, successive details of the source location are revealed sequentially, each detail being obtained with an additional set of detector data. The simplest results are obtained first, then the full source location is determined at the end. First 2601, signals may be acquired from the side detectors and the middle detector during a first integration time, and counting rates may be calculated. Then 2602, the side detector rates may be added and the sum compared 2603 to a normal background rate. If the summed signals are not significantly above background levels, the system may indicate 2604 that no source is present, or at least no source is yet detected. But if the sum of the side detector rates is above the normal backgrounds, then a source is known to be present, although its location is not yet determined. In that case, additional data may be acquired 2605 in a second integration period to enable a more reliable angular analysis. Then 2606, the differential may be calculated by subtracting one of the side detector rates from the other, and the differential may be compared 2607 to a predetermined threshold. If the differential is small or below a threshold, the task is done 2608 since the aiming plane is now aligned with the source. If the differential is not zero, or is not below a predetermined threshold, then additional detector data may then be acquired 2609 during a third integration time, to accumulate sufficient counts in the middle detector. For example, additional data may be required if the middle detector counting rate is still comparable to its statistical uncertainty, since in that case there are not enough middle detector counts to determine the magnitude of the source angle. After such additional acquisition, if necessary, the source angle may be calculated by dividing the differential by the middle detector rate 2610 and comparing the ratio to the predetermined angular correlation function 2611. The source location or source angle may then be reported 2612 by displaying it on a screen, transmitting it to a facility computer, storing it in media, or otherwise responding according to the application needs.

Optionally 2613 a fourth acquisition interval may be added to acquire sufficient data to reduce the angular uncertainty in the result. If a source is present, it is usually worth taking some extra data to obtain the best angle determination.

According to some embodiments, the predetermined angular correlation function may be a table of detection ratios versus source angle. The table values can be linearly interpolated whenever an intermediate value is needed between the table entries. The system can determine the sign of the source angle from the sign of the difference between the counting rates of the two side detectors, and then determine the magnitude of the source angle from the counting rate in the middle detector according to the predetermined angular correlation function.

Figure 27:
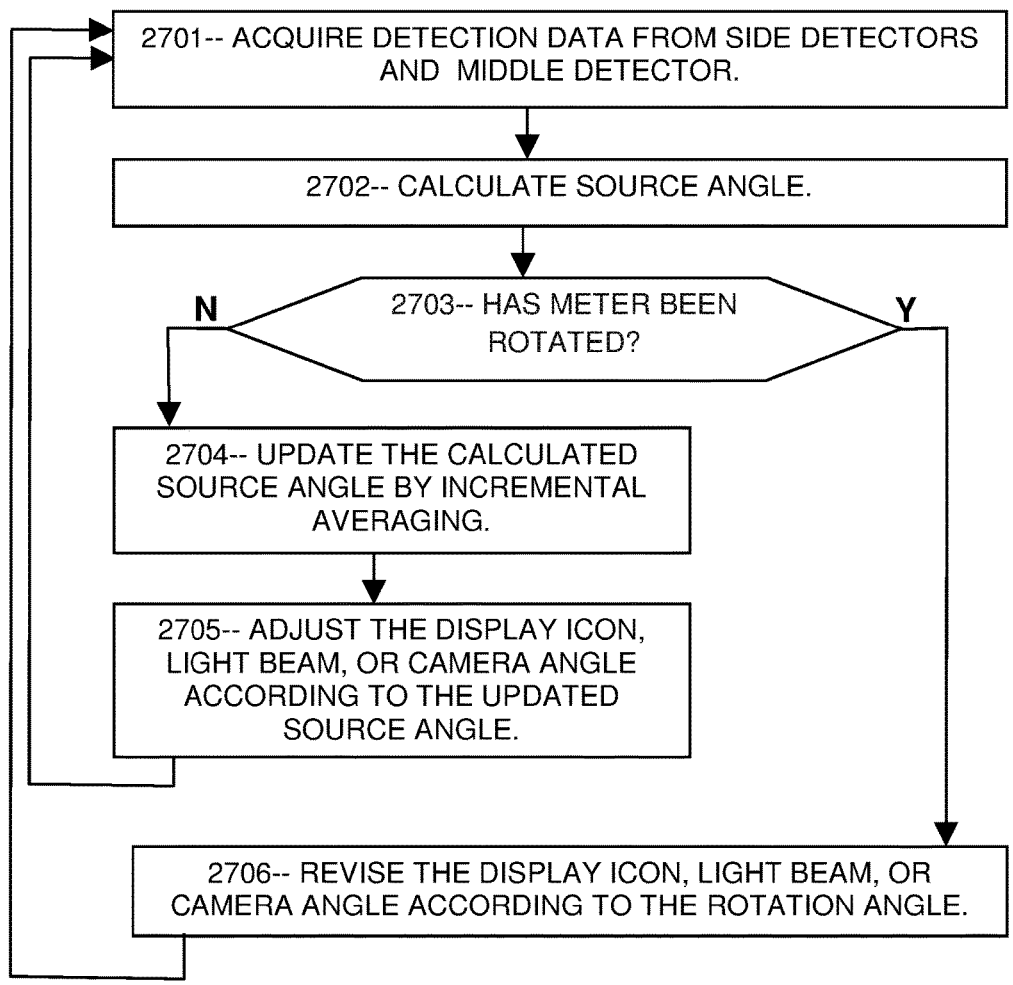
FIG. 27 is a flowchart showing steps of an exemplary method to update the calculated source angle.

FIG. 27 is a flowchart of an exemplary method to continuously or periodically update the source angle as conditions change, thereby causing the light beam or camera view or displayed icon to remain persistently aimed at the source location even as the system is rotated. The method of FIG. 27 may be particularly applicable to a portable radiation survey meter such as that disclosed in FIG. 17. First 2701, detection data may be acquired from the side and middle detectors. Then 2702 a calculated source angle value may be determined from the detection data, using the angular correlation method for example. Then 2703 the meter orientation may be checked to determine if the system has been rotated. This step may involve signals from a compass or accelerometer configured to sense rotations, or it may involve image processing to detect a change in direction, or other means for determining if the system has been rotated and by how much. If no such rotation is detected, then 2704 the source angle may be updated by combining the currently calculated value with the previously determined source angle results, so as to obtain a new value that reflects both the recent measurement and the past data. In some embodiments, combining the old and new data may include discarding or otherwise attenuating the oldest data while emphasizing the more recent results. For example, the processor may be configured to store sequential calculated values of the source angle in a ring buffer, such that each newest result overwrites the oldest value in the buffer, and then the entire set of values may be averaged to obtain a best-fit or maximum likelihood or time-average value of the source angle. Alternatively, the current result may be averaged incrementally with the prior average, wherein the current result and the prior average are weighted to obtain an updated average source angle. For example, in a particular embodiment, an updated average may be calculated by adding the old average times 0.9, plus the new value times 0.1. The resulting updated average thereby incorporates the new results incrementally into the running average while gradually attenuating the oldest measurements. Then 2705, using the updated average source angle so obtained, the system may redirect a light beam, and/or reorient the view of a camera, and/or redisplay a directional icon pointing toward the source according to the updated average source angle. If, on the other hand, the meter has been found to be rotated, then 2706 the display icon and/or light beam and/or camera angle may be revised according to the rotation angle (that is, adjusted opposite to the rotation angle), thereby causing the light beam or camera or icon to continue pointing toward the source location after the rotation. Thus the light beam or camera or icon may be adjusted according to the updated source angle if the system is not rotated, and if the system is rotated the items may be adjusted opposite to the rotation angle, so as to persistently remain centered on the source location. In addition, according to the exemplary flowchart, whenever such a rotation occurs, the most recent detection data may be discarded, since there is no way to know what orientation of the meter corresponded to while the meter was being rotated. In every case, the flow returns to the initial step 2701 of acquiring additional data. By causing the light beam or camera view or display icon to remain persistently locked onto the source location, while the source angle is repeatedly refined and while the meter is arbitrarily rotated, the system greatly assists operators in finding the source.

Embodiments of the system as described herein can provide many advantages over conventional detectors. (a) Embodiments can determine the full sign and magnitude of the angle between the aiming plane and the source direction. (b) Embodiments can determine the source angle from a single set of detector data without rotations or iteration. (c) In applications requiring that the system be aimed at the source, the system can be rotated according to the calculated angle and thereby converge on the source direction in only one rotation. (d) The system can achieve high detection efficiency because the detectors have an unobstructed view of the source particles regardless of the orientation of the system, the shields being almost completely surrounded by the side detectors. (e) Embodiments of the system can be compact, low-cost, easy to use in an inspection environment, suitable for a variety of important security scanning applications, and virtually immune to defeat by conventional shielding or obfuscation techniques.

The ability to localize a clandestine radioactive source rapidly is enabling for many applications in nuclear threat detection. Advanced radiation detection systems like those disclosed herein will be needed in the coming decades to protect innocent people from the threat of nuclear and radiological terrorism.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is defined by the appended claims.

What is claimed is:

1. A system for the detection and localization of a radioactive source comprising:
    two slab-shaped shields separated by a predetermined distance that are oriented parallel to a centrally positioned aiming plane, wherein each shield is configured to block most particles incident orthogonally thereon from the source;
    two side detectors positioned parallel to the shields, wherein each side detector is positioned proximate to an exterior face of a respective one of said two shields, and wherein the two side detectors are configured to emit signals upon detecting particles from the source;
    a middle detector positioned between the shields, wherein the middle detector is positioned closer to the front of the system than the back of the system and perpendicular to the aiming plane, and wherein the middle detector is configured to emit signals upon detecting particles from the source; and
    a processor configured to calculate, based at least in part upon the signals, the angle of the source location relative to the aiming plane.

2. The system of claim 1, wherein the width of the middle detector is at least six times the thickness of the middle detector.

3. The system of claim 1, wherein the front surface of the middle detector is substantially coplanar with the front surfaces of the shields.

4. The system of claim 1, wherein the front surface of the middle detector is recessed relative to the front surfaces of the shields by a distance of 0.5 to 1.5 times the distance between the shields.

5. The system of claim 1, further comprising a rear-facing detector, the rear-facing detector also configured to emit signals upon detecting particles from the radioactive source, wherein the rear-facing detector is positioned between the shields and oriented parallel to the middle detector, and wherein the rear-facing detector is recessed from the back of the shields by the same distance that the middle detector is recessed from the front of the shields.

6. The system of claim 1, wherein the middle detector is one of a plurality of middle detectors, wherein each middle detector of the plurality is positioned between the shields, closer to the front of the system than the back of the system and perpendicular to the aiming plane, and wherein each middle detector of the plurality is configured to emit signals upon detecting particles from the radioactive source.

7. The system of claim 1, further comprising a shield slug positioned between the shields and behind the middle detector, wherein the shield slug is configured to block most particles incident orthogonally thereon.

8. The system of claim 1, further comprising a fourth detector positioned between the shields and behind the middle detector, wherein the fourth detector is configured to measure the energies of the particles with an energy uncertainty of at most 10%.

9. The system of claim 1, further comprising a fourth detector positioned between the shields and behind the middle detector, wherein the fourth detector is configured to emit a first signal when at least partially traversed by an energetic electron, and a second signal that is different from the first signal when at least partially traversed by an energetic ion.

10. The system of claim 1, further comprising an upper detector and a lower detector that abut at a centrally positioned midplane that is orthogonal to the side detectors and orthogonal to the middle detector, wherein the upper detector and the lower detector are positioned between the shields and behind the middle detector, wherein the upper detector and the lower detector are configured to emit signals upon detecting particles from the radioactive source, and wherein the processor is further configured to compare detection data from the upper detector with detection data from the lower detector and thereby determine whether the source is above the midplane, below the midplane, or substantially on the midplane.

11. The system of claim 1, wherein each side detector comprises an upper side portion and a lower side portion, wherein each respective upper side portion and lower side portion abut at a centrally positioned midplane that is orthogonal to the side detectors and orthogonal to the middle detector, and wherein the processor is further configured to compare signals from the upper side portions and the lower side portions and thereby determine whether the source is above the midplane, below the midplane, or substantially on the midplane.

12. The system of claim 1, wherein the shields protrude frontward beyond the side detectors by a distance of 0.5 to 1.5 times the thickness of the side detectors.

13. The system of claim 1, wherein the shields are truncated relative to the back surfaces of the side detectors by a distance at least equal to the distance between the shields and at most equal to the distance between the side detectors.

14. The system of claim 1, wherein the two shields are further configured to emit distinct signals upon detecting particles from the source.

15. The system of claim 1, wherein the middle detector and the side detectors are configured to detect a first particle type, and wherein the shields are configured to detect a second particle type that is different from the first particle type.

16. The system of claim 1, wherein each shield comprises an upper shield portion and a lower shield portion, wherein each respective upper shield portion and lower shield portion abut at a centrally positioned midplane that is orthogonal to the side detectors and orthogonal to the middle detector, wherein each of said upper shield portions and lower shield portions is configured to detect particles, and wherein the processor is further configured to compare detection data of the upper shield portions and the lower shield portions and thereby determine whether the source is above the midplane, below the midplane, or substantially on the midplane.

17. The system of claim 1, further comprising two handles mounted on orthogonal surfaces of the system and two displays mounted on orthogonal surfaces of the system.

18. The system of claim 1 further comprising a display configured to show a directional icon pointing toward the calculated source location.

19. The system of claim 1, wherein the processor is further configured to generate an estimate of the source angle, wherein the estimate of the source angle is based at least in part upon the side detector signals, the middle detector signals, and a predetermined angular correlation function.

20. The system of claim 1, further comprising a non-transient computer-readable media containing instructions which, when executed by a computer, performs a process comprising:
- measuring detection rates of the side detectors and of the middle detector, respectively;
- calculating a differential equal to the difference between the detection rates of the two side detectors;
- dividing the differential by the middle detector detection rate, thereby obtaining a ratio;
- comparing the ratio to a predetermined angular correlation function that relates particle detection rates to particle directions; and
- determining, from the comparing, the sign and magnitude of the source angle.

* * * * *